US012754603B2

(12) United States Patent
Ashikaga

(10) Patent No.: US 12,754,603 B2
(45) Date of Patent: Oct. 6, 2026

(54) INFORMATION PROCESSING METHOD, INFORMATION PROCESSING SYSTEM, AND RECORDING MEDIUM TO CONTROL AN AVATAR FOR PRODUCT OBJECT CUSTOMIZATION

(71) Applicant: CASIO COMPUTER CO., LTD., Tokyo (JP)

(72) Inventor: Takaharu Ashikaga, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 142 days.

(21) Appl. No.: 18/543,161

(22) Filed: Dec. 18, 2023

(65) Prior Publication Data

US 2024/0211027 A1 Jun. 27, 2024

(30) Foreign Application Priority Data

Dec. 21, 2022 (JP) ................................. 2022-203988

(51) Int. Cl.
*G06F 3/01* (2006.01)
*G06F 3/04842* (2022.01)
(Continued)

(52) U.S. Cl.
CPC .......... *G06F 3/011* (2013.01); *G06F 3/04842* (2013.01); *G06Q 30/0643* (2013.01);
(Continued)

(58) Field of Classification Search
CPC ......... G06T 13/40; G06T 13/80; G06T 19/00; G06Q 30/06; G06Q 30/0621;
(Continued)

(56) References Cited

U.S. PATENT DOCUMENTS 8,255,807 B2 * 8/2012 Ganz ....................... G06F 3/011 446/175
2012/0324390 A1 * 12/2012 Tao ..................... G06F 3/04847 715/771
(Continued)

FOREIGN PATENT DOCUMENTS

CN 105590226 A 5/2016
CN 107015659 A 8/2017
(Continued)

OTHER PUBLICATIONS

Notice of Reasons for Refusal dated Jan. 9, 2024 received in Japanese Patent Application No. JP 2022-203988.
[VR Chat] Digital clock system for avatars [OSC].

*Primary Examiner* — Jacinta M Crawford
(74) *Attorney, Agent, or Firm* — Scully, Scott, Murphy & Presser, P.C.

(57) ABSTRACT

In an information processing method executed by a computer including a memory that stores a program and at least one processor that executes the program, the processor controls an action of an avatar corresponding to a user in a virtual space in response to an operation of the user, causes a display unit to display an interface in the virtual space, the interface being operated by the avatar to perform customization of a product object, and changes a setting related to the product object, in a case where the interface is operated by the avatar, to make the product object be customized in accordance with a content of the operation.

17 Claims, 17 Drawing Sheets

(51) Int. Cl.
*G06Q 30/0601* (2023.01)
*G06T 13/40* (2011.01)
*G06T 13/80* (2011.01)
*G06T 19/00* (2011.01)

(52) U.S. Cl.
CPC .............. *G06T 13/40* (2013.01); *G06T 13/80* (2013.01); *G06T 19/00* (2013.01)

(58) Field of Classification Search
CPC ..... G06Q 30/0643; G06F 3/011; G06F 3/012; G06F 3/0346; G06F 3/04842
USPC .......................................................... 345/473
See application file for complete search history.

(56) References Cited

U.S. PATENT DOCUMENTS

| | | | | |
|---|---|---|---|---|
| 2021/0201336 | A1* | 7/2021 | Mallett | G06F 3/011 |
| 2023/0004125 | A1* | 1/2023 | Knock | G06F 3/04842 |

FOREIGN PATENT DOCUMENTS

| | | | |
|---|---|---|---|
| JP | 2008217142 | A | 9/2008 |
| JP | 2009211251 | A | 9/2009 |
| JP | 2020042802 | A | 3/2020 |
| JP | 2020525932 | A | 8/2020 |
| JP | 2021002087 | A | 1/2021 |
| JP | 2022036691 | A | 3/2022 |
| JP | 7058898 | B1 | 4/2022 |
| JP | 2022117770 | A | 8/2022 |

* cited by examiner

132

| USER ID | AVATAR ID | AVATAR INFORMATION | | | ··· |
|---|---|---|---|---|---|
| | | TOTAL LENGTH | WRIST MAXIMUM DIAMETER | WRIST SHAPE | |
| U001 | A001 | 150 | 10 | CYLINDER | ··· |
| U002 | A002 | 120 | 8 | CYLINDER | ··· |
| U003 | A003 | 90 | 9 | ELLIPTICAL CYLINDER | ··· |
| : | : | : | : | : | : |

FIG. 5

232

2321

| OBJECT ID | NAME | DISPLAY MAGNIFICATION CORRECTION | SHAPE CORRECTION | WEARING TARGET AVATAR | | CUSTOMIZATION INFORMATION | | | | | … |
|---|---|---|---|---|---|---|---|---|---|---|---|
| | | | | AVATAR ID | REGION | CUSTOMIZED DESIGN ID | BASE DESIGN | BEZEL COLOR | FACE COLOR | … | |
| OJ001 | WATCH | 1.1 | CYLINDER | A001 | RIGHT WRIST | D2921 | TYPE01 | RED | BLACK | … | … |
| OJ002 | WATCH | 0.8 | ELLIPTICAL CYLINDER | A003 | LEFT WRIST | D3418 | TYPE01 | YELLOW | WHITE | … | … |
| OJ003 | WATCH | 1 | CYLINDER | – | – | – | TYPE05 | – | – | … | … |
| : | : | : | : | : | : | : | : | : | : | : | : |

FIG. 22

132

| USER ID | AVATAR ID | AVATAR INFORMATION | | HELD NFT INFORMATION | | | ... |
|---|---|---|---|---|---|---|---|
| | | TOTAL LENGTH | ... | NFTID | CUSTOMIZED DESIGN ID | TARGET RANGE | |
| U001 | A001 | 150 | ... | N033 | D2921 | BEZEL/FACE | ... |
| U002 | A002 | 120 | ... | – | – | – | ... |
| U003 | A003 | 90 | ... | N059 | D3418 | WHOLE | ... |
| : | : | : | : | : | : | : | : |

INFORMATION PROCESSING METHOD, INFORMATION PROCESSING SYSTEM, AND RECORDING MEDIUM TO CONTROL AN AVATAR FOR PRODUCT OBJECT CUSTOMIZATION

REFERENCE TO RELATED APPLICATION

The present application claims priority based on Japanese Patent Application No. 2022-203988 filed on Dec. 21, 2022, the specification, claims, abstract, and drawings of 2022-203988 which are incorporated herein by reference in their entirety.

BACKGROUND OF THE INVENTION

The present invention relates to an information processing method, an information processing system, and a recording medium.

Conventionally, services in which an avatar is operated according to an operation of a user in a virtual space constructed by a computer to enable communication with another user operating another avatar or participation in an event or a game held in the virtual space have been realized. Some of such services enable an avatar to wear product objects such as clothes and jewelry (for example, Japanese Patent Application Laid-Open No. 2008-217142).

SUMMARY OF THE INVENTION

An information processing method according to the present invention is an information processing method executed by a computer including a memory that stores a program and at least one processor that executes the program, the information processing method including the steps of: controlling, by the processor, an action of an avatar corresponding to a user in a virtual space in response to an operation of the user; causing, by the processor, a display unit to display an interface in the virtual space, the interface being operated by the avatar to perform customization of a product object; and changing, by the processor, a setting related to the product object, in a case where the interface is operated by the avatar, to make the product object be customized in accordance with a content of the operation.

An information processing system according to the present invention includes a processing unit configured to: control an action of an avatar corresponding to a user in a virtual space in response to an operation of the user; cause a display unit to display an interface in the virtual space, the interface being operated by the avatar to perform customization of a product object; and change a setting related to the product object, in a case where the interface is operated by the avatar, to make the product object be customized in accordance with a content of the operation.

An information processing method according to the present invention is an information processing method executed by a computer of a terminal device including a display unit, an input unit, and at least one processor, the information processing method including the steps of: causing, by the processor, the display unit to display an interface in a virtual space, the interface being operated by an avatar to perform customization of a product object; receiving, by the processor, a user operation corresponding to an operation on the interface by the avatar in the virtual space via the input unit; and causing, by the processor, the display unit to display the product object customized in accordance with a content of the operation on the interface by the avatar based on the user operation received via the input unit.

BRIEF DESCRIPTION OF THE SEVERAL VIEWS OF THE DRAWING

FIG. 5 is a view illustrating an example of contents of object data;

FIG. 22 is a view illustrating an example of contents of user management data according to the modification.

DETAILED DESCRIPTION OF THE INVENTION

Hereinafter, embodiments of the present invention will be described with reference to the drawings.

(Outline of Information Processing System)

Figure 1:
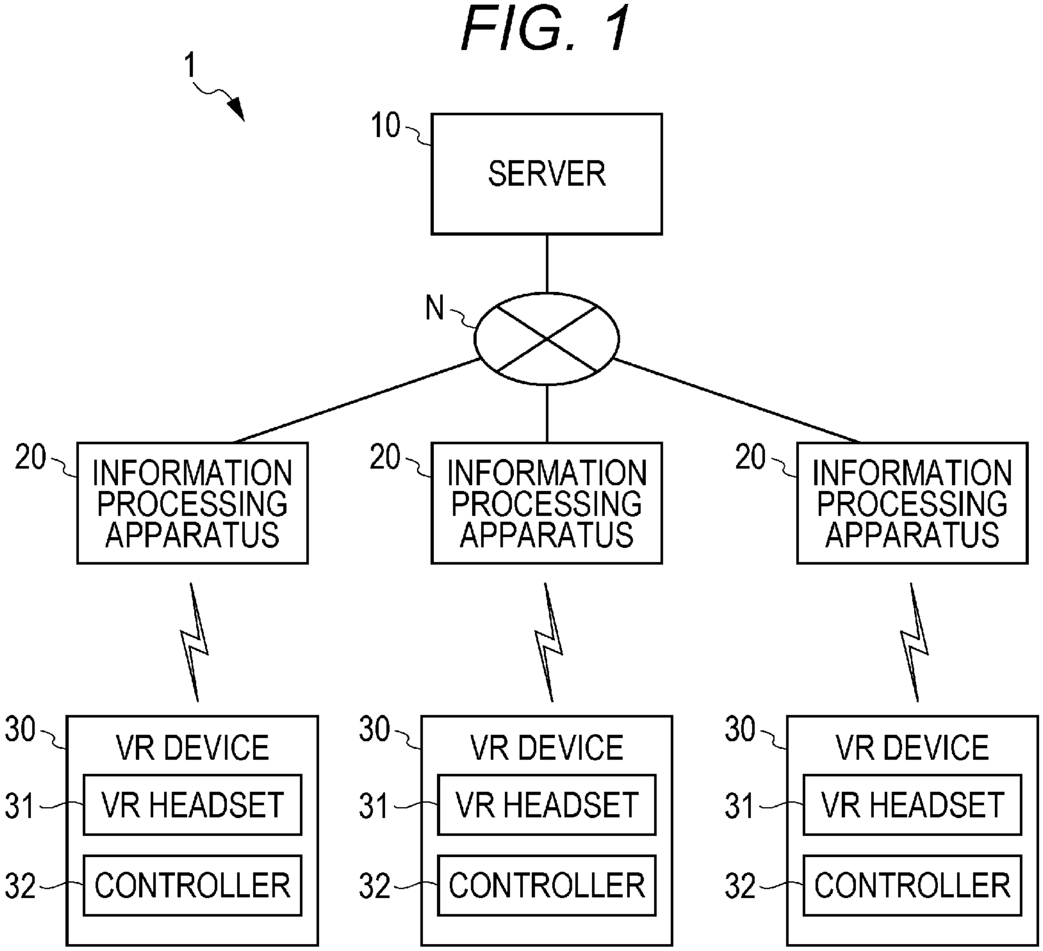
FIG. 1 is a diagram illustrating a configuration of an information processing system.

FIG. 1 is a diagram illustrating a configuration of an information processing system 1.

The information processing system 1 includes a server 10, a plurality of information processing apparatuses 20, and a plurality of VR devices 30 (terminal devices). The information processing system 1 provides various services in a three-dimensional virtual space (metaverse) constructed by a computer to a plurality of users who use the information processing system 1. In addition, the information processing system 1 can provide the users with a service where virtual reality (VR) is applied in the metaverse. The VR is a technology for allowing the users to experience a virtual world constructed in the virtual space as if the virtual world was real.

Each of the users of the information processing system 1 uses one information processing apparatus 20 and one VR device 30. The information processing apparatus 20 and the VR device 30 are connected so as to enable transmission and reception of data by wireless communication. The VR device 30 includes a VR headset 31 (head-mounted device) worn and used by the user and a controller 32. The VR device 30 detects an action and an input operation of the user by the VR headset 31 and the controller 32, and transmits a detection result to the information processing apparatus 20. The information processing apparatus 20 transmits data such as an image of the virtual space and a voice to the VR headset 31 in response to the user's action and input operation detected by the VR device 30, and causes the VR headset 31 to display the image and output the voice. In this manner, the VR is realized by causing the VR headset 31 to display the image of the virtual space and output the voice in real time in response to the user's action or input operation. In the virtual space, a character called an avatar 40 (see FIGS. 13 to 15) acts instead of the user. In other words, the image of the virtual space viewed from a perspective of the avatar 40 is displayed on the VR headset 31 in real time.

The information processing system 1 of the present embodiment provides various services (hereinafter referred to as a "virtual store service") related to a watch (wristwatch) as a product in a virtual store 200 (see FIG. 7) constructed in a virtual space 2. Examples of the virtual store service provided in the virtual store 200 include a service in which the user freely customizes a design of a watch object (product object) that can be worn by the avatar 40, a service in which the customized watch object is generated and worn (tried) on the avatar 40, a service in which a watch having the same design as the customized watch object is ordered in the real world, and the like. Details thereof will be described later.

A plurality of the information processing apparatuses 20 are connected to the server 10 via a network N, and can transmit and receive data to and from the server 10. The network N is, for example, the Internet, but is not limited thereto. The server 10 is managed by, for example, a service provider in the virtual store 200. The server 10 transmits various types of data necessary for providing the services in the virtual store 200 to the plurality of information processing apparatuses 20. In addition, the server 10 receives and manages data related to the users, data related to customization and sales of watches, and the like from the plurality of information processing apparatuses 20.

Hereinafter, each constituent element of the information processing system 1 will be described in detail.

(Configuration of Server)

Figure 2:
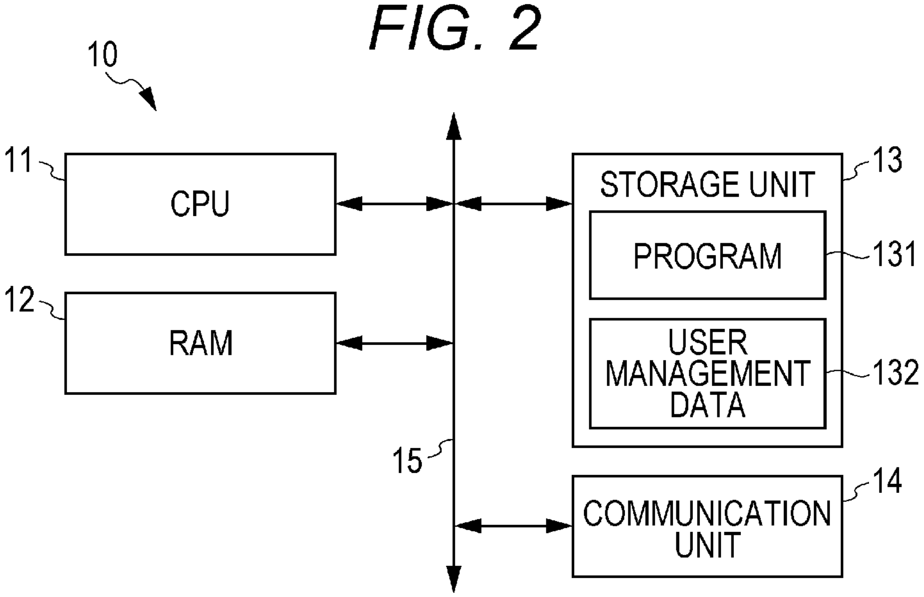
FIG. 2 is a block diagram illustrating a functional configuration of a server.

FIG. 2 is a block diagram illustrating a functional configuration of the server 10.

The server 10 includes a central processing unit (CPU) 11, a random access memory (RAM) 12, a storage unit 13, a communication unit 14, a bus 15, and the like. The respective units of the server 10 are connected via the bus 15. Note that the server 10 may further include an operation unit, a display unit, and the like used by an administrator of the server 10.

The CPU 11 is a processor that reads and executes a program 131 stored in the storage unit 13 and performs various types of arithmetic processing to control operations of the respective units of the server 10. Note that the server 10 may include a plurality of processors (for example, a plurality of CPUs), and the plurality of processors may execute a plurality of processes executed by the CPU 11 of the present embodiment. In this case, the plurality of processors may be involved in a common process, or the plurality of processors may independently execute different processes in parallel.

The RAM 12 provides the CPU 11 with a working memory space and stores temporary data.

The storage unit 13 is a non-transitory recording medium readable by the CPU 11 as a computer, and stores the program 131 and various types of data. The storage unit 13 includes a non-volatile memory such as a hard disk drive (HDD) or a solid state drive (SSD). The program 131 is stored in the storage unit 13 in the form of a computer-readable program code. Examples of the data stored in the storage unit 13 include user management data 132 in which information related to the plurality of users of the information processing system 1 is recorded, and the like.

Figures 3, 4:
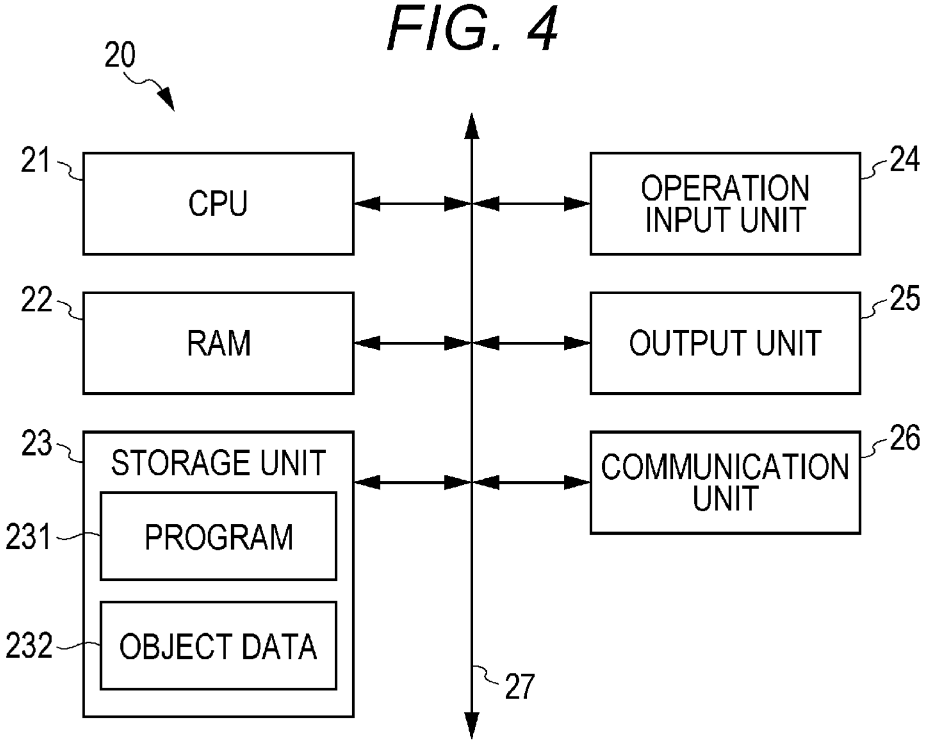
FIG. 3 is a view illustrating an example of contents of user management data.
FIG. 4 is a block diagram illustrating a functional configuration of an information processing apparatus.

FIG. 3 is a view illustrating an example of contents of the user management data 132.

One row data in the user management data 132 corresponds to one user. Each row data includes data of items such as a "user ID", an "avatar ID", and "avatar information".

The "user ID" is a unique code assigned to each of the users.

The "avatar ID" is a unique code assigned to the avatar 40 corresponding to the user.

The "avatar information" includes a plurality of sub-items related to features of the avatar 40. Here, a "total length", a "wrist maximum diameter", and a "wrist shape" are exemplified as the sub-items.

The "total length" is a total length (height in case of the avatar 40 having a human shape) of the avatar 40 in the virtual space 2.

The "wrist maximum diameter" is the maximum diameter of a wrist of the avatar 40.

The "wrist shape" is a shape of the wrist of the avatar 40. The "wrist shape" may be represented by a numerical value such as a ratio between the maximum diameter and the minimum diameter.

The unit of the "total length" and the "wrist maximum diameter" can be any unit length related to a length in the virtual space 2. The "total length", the "wrist maximum diameter", and the "wrist shape" are referred to in a case where automatic adjustment of a size and/or a shape of a watch object, which will be described later, is performed.

The user management data 132 may further include data of items not illustrated in FIG. 3. For example, data of items such as an attribute, a characteristic, a login history, and a product purchase history of the user may be further included.

Returning to FIG. 2, the communication unit 14 performs a communication operation according to a predetermined communication standard. The communication unit 14 transmits and receives data to and from the information processing apparatus 20 via the network N by the communication operation.

(Configuration of Information Processing Apparatus)

FIG. 4 is a block diagram illustrating a functional configuration of the information processing apparatus 20.

The information processing apparatus 20 includes a CPU 21 (a processing unit or a computer), a RAM 22, a storage unit 23, an operation input unit 24, an output unit 25, a communication unit 26, a bus 27, and the like. The respective units of the information processing apparatus 20 are connected via the bus 27. The information processing apparatus 20 is, for example, a notebook PC or a stationary PC, but is not limited thereto, and may be a tablet terminal, a smartphone, or the like.

The CPU 21 is a processor that reads and executes a program 231 stored in the storage unit 23 and performs various types of arithmetic processing to control operations of the respective units of the information processing apparatus 20. Note that the information processing apparatus 20 may include a plurality of processors (for example, a plurality of CPUs), and the plurality of processors may execute a plurality of processes executed by the CPU 21 of the present embodiment. In this case, a "processing unit" includes a plurality of processors. In this case, the plurality of processors may be involved in a common process, or the plurality of processors may independently execute different processes in parallel.

The RAM 22 provides the CPU 21 with a working memory space and stores temporary data.

The storage unit 23 is a non-transitory recording medium readable by the CPU 21 as a computer, and stores programs such as the program 231 and various types of data. The storage unit 23 includes, for example, a non-volatile memory such as an HDD or an SSD. The program is stored in the storage unit 23 in the form of a computer-readable program code. Examples of the data stored in the storage unit 23 include object data 232 in which information related to objects in the virtual space 2 is recorded, and the like. Note that the object data 232 may be stored in the storage unit 13 of the server 10, or an aspect may be adopted in which the CPU 21 of the information processing apparatus 20 acquires information of the object data 232 from the server 10 as necessary via the communication unit 26.

FIG. 5 is a view illustrating an example of contents of the object data 232.

One row data in the object data 232 corresponds to one object. FIG. 5 illustrates data related to a watch object handled in the virtual store 200 among the objects on the virtual space 2. Each row data includes data of items such as an "object ID", a "name", "display magnification correction", "shape correction", "wearing target avatar", and "customization information".

The "object ID" is a unique code assigned to each of the objects.

The "name" is a name of each of the objects, and is "watch" here.

The "display magnification correction" is a setting related to a size when the object is displayed. Here, the size of the object is represented by a magnification with a default size set to 1. A value larger than 1 indicates that display is performed in an enlarged manner from the default size, and a value smaller than 1 indicates that display is performed in a reduced manner from the default size. The watch object is displayed with a size suitable for the avatar 40 by adjusting the setting of the "display magnification correction" in accordance with a total length, a wrist maximum diameter, and the like of the avatar 40 as a wearing target. The setting of the "display magnification correction" is one aspect of a "setting related to a size of a product object".

Note that the setting related to a size of an object is not necessarily represented by the display magnification, and for example, a size of an object (a width, a length, or the like of the entire object or a predetermined region thereof) may be directly designated.

The "shape correction" is a setting related to correction of a shape when an object is displayed. Here, a shape of a band of the watch when the watch object is worn on the avatar 40 is designated. For example, a shape of the watch object is corrected such that the band is cylindrical if the "shape correction" is a "cylinder", and the shape of the watch object is corrected such that the band is elliptical cylindrical if the "shape correction" is an "elliptical cylinder". In a case where the "shape correction" is the "elliptical cylinder", an ellipticity of an ellipse may be further designated. The watch object is displayed in a shape suitable for the avatar 40 by adjusting the setting of the "shape correction" in accordance with the wrist shape of the avatar 40 as the wearing target. The setting of the "shape correction" is one aspect of a "setting related to a shape of a product object".

The "wearing target avatar" is information of the avatar 40 in a case where an object (here, the watch object) is worn on the avatar 40. Here, the "wearing target avatar" includes sub-items of an "avatar ID" and a "region". The "avatar ID" is an avatar ID corresponding to the avatar 40 wearing the object. The "region" represents a region where the object is worn among a plurality of regions of the avatar 40. In a case where the object is not worn on any avatar 40, the "wearing target avatar" is blank data (blank). In a case where a setting value is input to the "wearing target avatar", a position and an orientation of the object are updated as needed so as to follow a movement of a set region of the avatar 40. As a result, a display effect in which the object is worn on the region of the avatar 40 can be obtained.

The "customization information" indicates a content of customization in a case where a design of the watch object, which will be described later, is customized. Specifically, the "customization information" includes sub-items such as a "customized design ID", a "base design", and a "bezel color" and a "face color" representing colors of respective components (parts) of the watch.

The "customized design ID" is a unique code representing a customized design set for the watch object.

The "base design" is a unique code representing a design used as a base of the customization. In a case where the customized design is used as the base, the "base design" is the customized design ID described above.

Figure 9:
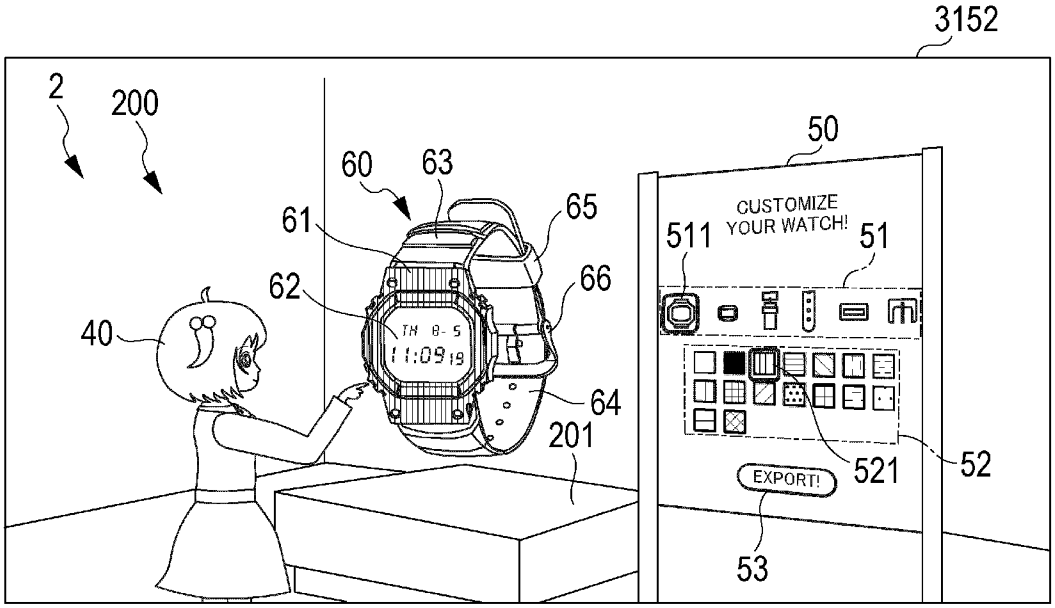
FIG. 9 is a view illustrating a state in which a bezel icon is selected.

The watch object of the present embodiment includes, as components, a bezel 61, a face 62 (watch face), a short band 63, a long band 64, a free loop 65, and a buckle 66 (see FIG. 9). Each of the components includes one or more parts. For example, the component of the face 62 include a printed glass, a liquid crystal display, a control circuit, a case, and the like. The sub-items of "customization information" include, for example, the sub-items of the "bezel color" representing a color of the bezel 61, the "face color" representing a color of the face 62, a "short band color" representing a color of the short band 63, a "long band color" representing a color of the long band 64, a "free loop color" representing a color of the free loop 65, and a "buckle color" representing a color of the buckle 66 (the sub-items other than the "bezel color" and the "face color" are omitted in FIG. 5). In a case where the design of the watch object has not been customized, the items other than the "base design" in the "customization information" are blank data (blank). In this case, the design of the watch object is the same as the "base design".

FIG. 5 is an example of a data configuration for specifying a size, a shape, a wearing target avatar, and a customized design of an object in the object data 232, and is not limited thereto. In addition, the object data 232 may further include a data item not illustrated in FIG. 5. For example, information that can specify a position and an orientation of an object in the virtual space 2 and an outer shape of the object (such as a file path of 3D model data of the object) may be included.

In addition, the object data 232 further includes row data related to various objects that can be constituent elements of the virtual space 2 although the row data related to the watch object has been exemplified in FIG. 5. For example, the object data 232 includes data related to objects such as the interior and fixtures of the virtual store 200 and the avatars 40 of the respective users. At least a portion of data related to the avatar 40 may be extracted from the user management data 132 of the server 10.

In addition, information regarding the colors of the respective components such as the bezel color and the face color is stored in the sub-items of the customization information in FIG. 5, but design patterns of the respective components may be added. For example, "dot pattern" representing a design type is stored for the sub-item "bezel design".

Returning to FIG. 4, the operation input unit 24 receives an input operation of a user and outputs an input signal according to the input operation to the CPU 21. The operation input unit 24 includes, for example, input devices such as a keyboard, a mouse, and a touch panel.

The output unit 25 outputs information related to a processing content, various statuses, and the like in the information processing apparatus 20 to the user. The output unit 25 includes, for example, a display device such as a liquid crystal display, a sound output device such as a speaker, a light emitting device such as a light-emitting diode (LED), and the like.

The communication unit 26 performs a communication operation according to a predetermined communication standard. The communication unit 26 transmits and receives data to and from the server 10 via the network N by the communication operation. In addition, the communication unit 26 transmits and receives data to and from the VR device 30 by wireless communication.

(Configuration of VR Device)

Figure 6:
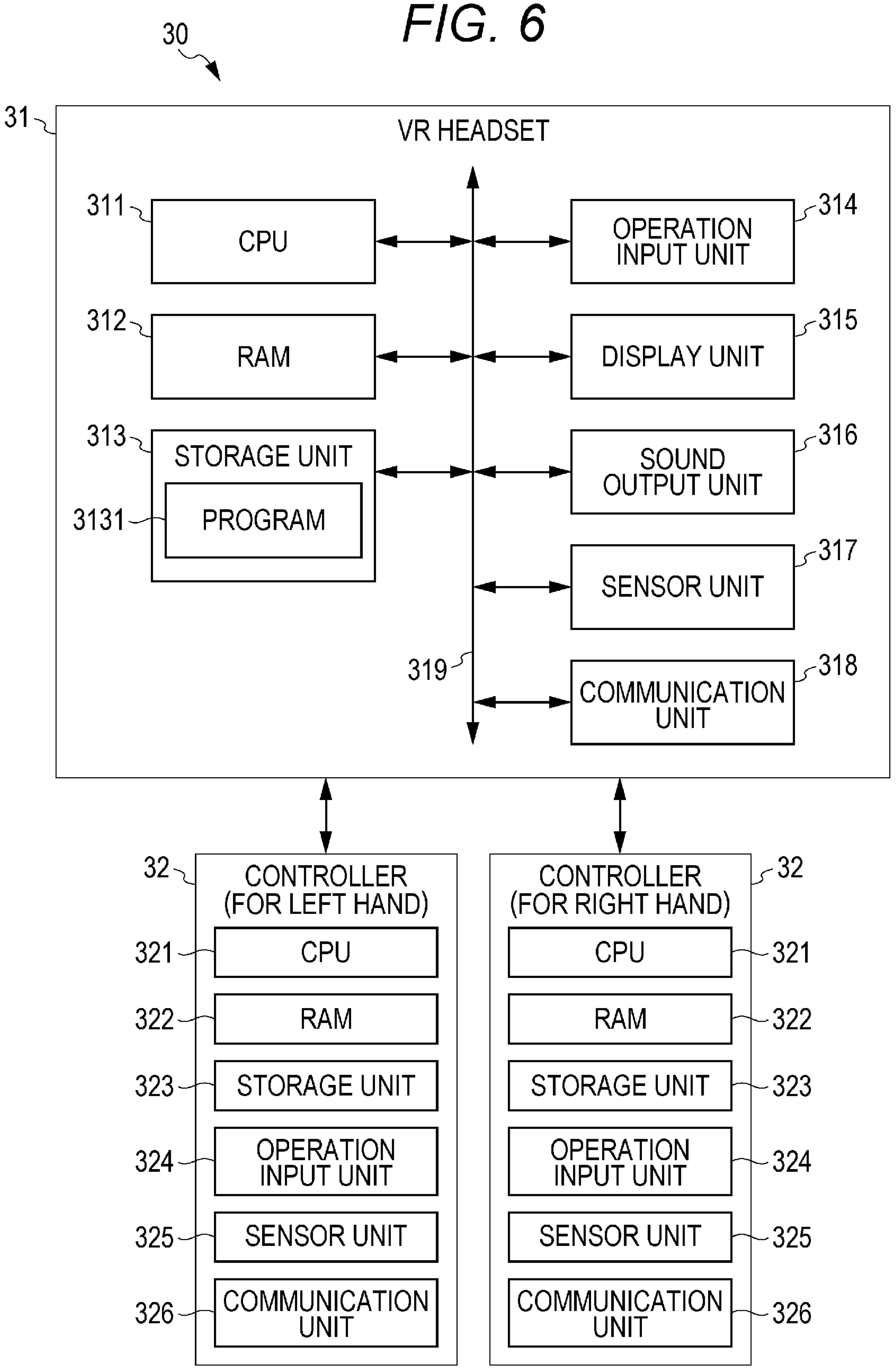
FIG. 6 is a block diagram illustrating a functional configuration of a VR device.

FIG. 6 is a block diagram illustrating a functional configuration of the VR device 30.

The VR device 30 includes the VR headset 31, the controller 32 for a right hand, and the controller 32 for a left hand. The two controllers 32 are connected to the VR headset 31 in a wireless or wired manner so as to enable data communication. The VR headset 31 is used by being worn on a head of a user. The controllers 32 are used by being worn or held on hands of the user. The controllers 32 correspond to an "input unit".

The VR headset 31 includes a CPU 311, a RAM 312, a storage unit 313, an operation input unit 314, a display unit 315, a sound output unit 316, a sensor unit 317, a communication unit 318, a bus 319, and the like. The respective units of the VR headset 31 are connected via the bus 319.

The CPU 311 is a processor that reads and executes a program 3131 stored in the storage unit 313 and performs various types of arithmetic processing to control operations of the respective units of the VR headset 31. Note that the VR headset 31 may include a plurality of processors (for example, a plurality of CPUs), and the plurality of processors may execute a plurality of processes executed by the CPU 311 of the present embodiment. In this case, the plurality of processors may be involved in a common process, or the plurality of processors may independently execute different processes in parallel.

The RAM 312 provides the CPU 311 with a working memory space and stores temporary data.

The storage unit 313 is a non-transitory recording medium readable by the CPU 311 as a computer, and stores the program 3131 and various types of data. The storage unit 313 includes, for example, a non-volatile memory such as a flash memory. The program 3131 is stored in the storage unit 313 in the form of a computer-readable program code.

The operation input unit 314 includes various switches, buttons, and the like, receives an input operation of the user, and outputs an input signal according to the input operation to the CPU 311. In addition, the operation input unit 314 may include a microphone, and may be capable of receiving the input operation by the user's voice using the microphone. The operation input unit 314 corresponds to the "input unit".

The display unit 315 displays an image to be visually recognized by the user wearing the VR headset 31. The display unit 315 includes a liquid crystal display, an organic EL display, or the like provided at a position visually recognizable by the user wearing the VR headset 31. Image data of the image displayed by the display unit 315 is transmitted from the information processing apparatus 20 to the VR headset 31. The display unit 315 displays the image on the basis of the received image data under the control of the CPU 311.

The sound output unit 316 outputs various sounds to be recognized by an auditory sense of the user wearing the VR headset 31. The sound output unit 316 includes a speaker that outputs the sounds. Sound data of the sounds output by the sound output unit 316 is transmitted from the information processing apparatus 20 to the VR headset 31. The sound output unit 316 outputs the sounds on the basis of the received sound data under the control of the CPU 311.

The sensor unit 317 detects a movement and an orientation of the head of the user wearing the VR headset 31. The sensor unit 317 includes, for example, a three-axis acceleration sensor, a three-axis gyro sensor, and a three-axis geomagnetic sensor. The three-axis acceleration sensor detects acceleration in each axial direction applied to the VR headset 31 according to the movement of the user at a predetermined sampling frequency, and outputs acceleration data to the CPU 311 as a detection result. The three-axis gyro sensor detects an angular velocity about each axis applied to the VR headset 31 according to the movement of the user at a predetermined sampling frequency, and outputs angular velocity data to the CPU 311 as a detection result. The three-axis geomagnetic sensor detects a magnitude of geomagnetism passing through the VR headset 31 at a predetermined sampling frequency, and outputs geomagnetism data to the CPU 311 as a detection result. The data output from the three-axis acceleration sensor, the three-axis gyro sensor, and the three-axis geomagnetic sensor includes signal components for three axes orthogonal to each other. The CPU 311 derives the movement and orientation of the head of the user on the basis of the acceleration data, the angular velocity data, and the geomagnetic data received from the sensor unit 317. The sensor unit 317 can receive the movement and orientation of the user as a user operation, and corresponds to the "input unit".

The communication unit 318 performs a communication operation according to a predetermined communication standard. Through this communication operation, the communication unit 318 transmits and receives data to and from the controllers 32 and the information processing apparatus 20 by wireless communication.

Each of the controller 32 includes a CPU 321 that performs the overall control of operations of the controller 32, a RAM 322 that provides the CPU 321 with a working memory space, a storage unit 323 that stores a program, data necessary for executing the program, and the like, an operation input unit 324, a sensor unit 325, a communication unit 326 that performs data communication with the VR headset 31, and the like.

The operation input unit 324 includes various switches, buttons, operation keys, and the like, receives an input operation of the user, and outputs an input signal according to the input operation to the CPU 321. In addition, the operation input unit 324 may be capable of separately detecting movements of fingers of the user.

The sensor unit 325 includes a three-axis acceleration sensor, a three-axis gyro sensor, and a three-axis geomagnetic sensor, and detects a movement and an orientation of the hand of the user holding or wearing the controller 32. A configuration and an operation of the sensor unit 325 may be similar to those of the sensor unit 317 of the VR headset 31, for example.

Note that the configuration of the VR device 30 is not limited to the above.

For example, the VR device 30 may further include an auxiliary sensor device that is not held or worn by the user. This sensor device may be, for example, a device that is installed on a floor or the like and optically detects a movement of the user or movements of the VR headset 31 and the controllers 32 by laser scanning or the like.

In addition, one of the controllers 32 may be omitted in a case where it is not necessary to separately detect movements of the both hands or the like. In addition, the controllers 32 may be omitted in a case where it is possible to detect necessary action and input operation of the user by the VR headset 31.

(Operations of Information Processing System)

Next, operations of the information processing system 1 will be described.

In the following description regarding the operations, an operation subject is the CPU 11 of the server 10, the CPU 21 of the information processing apparatus 20, the CPU 311 of the VR headset 31, or the CPU 321 of the controller 32. However, for convenience of description, the server 10, the information processing apparatus 20, the VR headset 31, or the controller 32 will be referred to as the operation subject in some cases.

In addition, a movement and an input operation of a user detected by the VR device 30 will be collectively referred to as a "user operation" hereinafter. That is, the "user operation" of the present embodiment includes input operations detected by the operation input unit 314 of the VR headset 31 and the operation input unit 324 of the controller 32, and actions detected by the sensor unit 317 of the VR headset 31 and the sensor unit 325 of the controller 32.

In addition, an image display operation in the VR headset 31 will be mainly described in the following description, and description will be omitted regarding other operations such as output of a sound.

<Start of Virtual Store Service and Operation Related to VR>

In a case where the user starts to use the above-described virtual store service provided by the information processing system 1, the user wears the VR headset 31 and the controller 32 of the VR device 30 and performs a predetermined operation for starting the service. In response to the operation, authentication information of the user is transmitted from the information processing apparatus 20 to the server 10. When the user is authenticated by the server 10, an authentication result is returned from the server 10 to the information processing apparatus 20, and the virtual store service for the authenticated user is started.

When the virtual store service is started, transmission of image data of the virtual store 200 from the information processing apparatus 20 to the VR headset 31 of the VR device 30 is started. Here, a position of the avatar 40 of the user in the virtual store 200 is set to a predetermined initial position, and the image data of the virtual store 200 viewed from the perspective of the avatar 40 at the initial position is transmitted to the VR headset 31. Accordingly, the display unit 315 of the VR headset 31 starts to display a VR screen 3151 of the virtual store 200 on the basis of the received image data.

Figure 7:
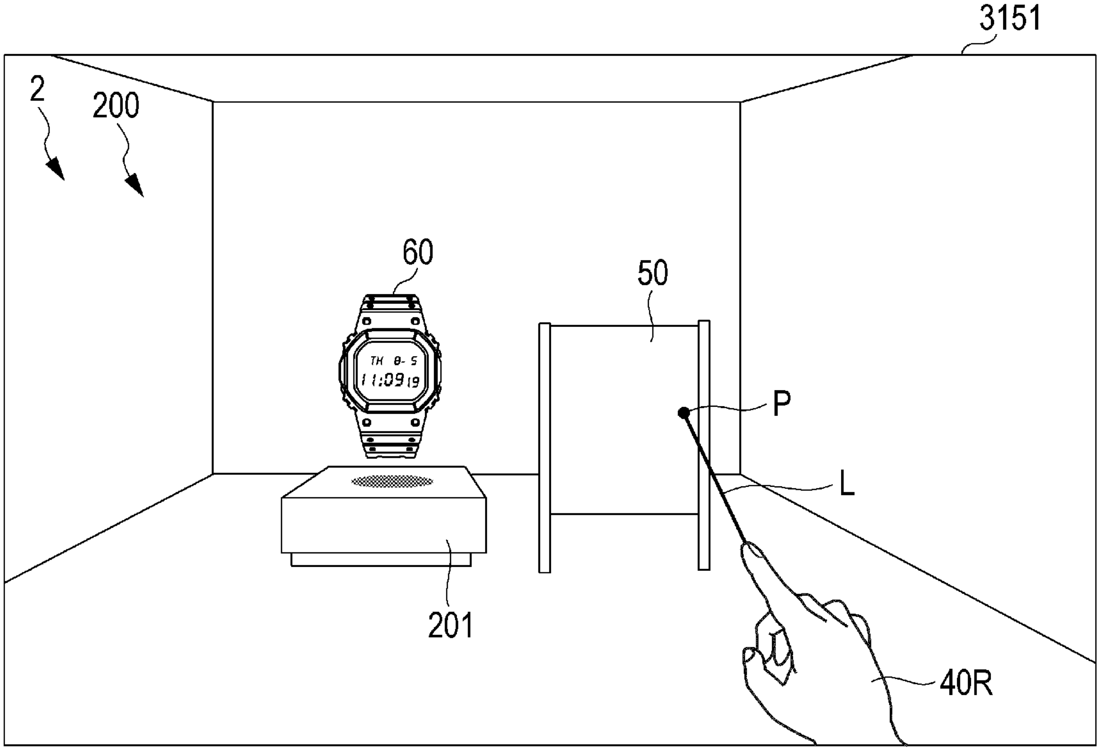
FIG. 7 is a view illustrating a VR screen.

FIG. 7 is a view illustrating the VR screen 3151.

The VR screen 3151 includes an image three-dimensionally representing the inside of the virtual store 200. A customization interface (IF) 50 and a sample object 60 are installed inside the virtual store 200.

The customization IF 50 is an interface operated by the avatar 40 to customize the design of the watch object.

The sample object 60 is an object of a model obtained by enlarging the watch object. The sample object 60 reflects a content of customization performed by the customization IF 50. The sample object 60 is arranged in a space on a pedestal 201.

The time displayed in the sample object 60 reflects the time in the real world. For example, set time in any of the server 10, the information processing apparatus 20, and the VR device 30 is reflected on display time in the sample object 60. As the display time in the sample object 60, a mark "PM" may be lighted in the afternoon as the 12-hour system display. In addition, 24-hour system display may be used.

A position, an orientation, a shape, and the like of each of the objects (the interior of the virtual store 200, the customization IF 50, the sample object 60, and the like) in the virtual store 200 are generated on the basis of the information of the object data 232 of the information processing apparatus 20. The information of each of the objects in the object data 232 may be stored in advance in the storage unit 23 of the information processing apparatus 20, or may be transmitted from the server 10 to the information processing apparatus 20 in a case where the virtual store service is started.

In addition, when the virtual store service is started, detection of the user operation by the VR device 30 is started, and a detection result is continuously transmitted to the information processing apparatus 20. The information processing apparatus 20 controls an action of the avatar 40 in the virtual store 200 (the virtual space 2) in accordance with the received user operation. That is, the information processing apparatus 20 converts the received user operation into the action of the avatar 40 in the virtual store 200, and specifies and updates a position, an orientation, a posture, and the like of the avatar 40 in the virtual store 200 in real time. Then, the information processing apparatus 20 generates image data of the virtual store 200 viewed from the perspective of the avatar 40 having the updated position and orientation, and transmits the image data to the VR headset 31. These generation and transmission of image data are repeatedly performed at a predetermined frame rate. The display unit 315 of the VR headset 31 displays the VR screen 3151 at the above-described frame rate on the basis of the received image data of the virtual store 200. As a result, the user wearing the VR headset 31 can visually recognize the inside of the virtual store 200 in real time from the perspective of the avatar 40 moving and acting inside the virtual store 200 in response to the user's own operation.

Since the VR screen 3151 is a first-person perspective from the avatar 40, the avatar 40 does not basically appear on the VR screen 3151. However, in a case where an arm is moved to a position within a field of view of the avatar 40 or a line of sight of the avatar 40 is oriented to its own body, a part of the avatar 40 appears on the VR screen 3151 depending on a positional relationship between the field of view of the avatar 40 and the arm or the body. In FIG. 7, the user is performing an action of extending a right arm forward, and accordingly, a right hand 40R of the avatar 40 appears in the VR screen 3151.

<Operation Related to Customization of Watch Object>

As illustrated in FIG. 7, in the virtual store 200, a virtual line L extends from a fingertip of the avatar 40, and a pointer P is generated at an intersection between the virtual line L and the object. When a predetermined operation in a state in which the pointer P is aligned with a position of a desired target, the target inside the virtual store 200 can be selected. A position and orientation of the virtual line L are derived on the basis of a position and an orientation of a finger of the avatar 40 specified in accordance with the user operation. A position of the pointer P is derived as the intersection between the derived virtual line L and a surface of each of the objects in the virtual space 2 specified from the object data 232. Note that the virtual line L and the pointer P may be displayed only in a case where a distance between the fingertip and the object is equal to or shorter than a predetermined distance. In a case where the user desires to customize the design of the watch object, the user operates the customization IF 50 by an action of the avatar 40 using the pointer P.

Figure 8:
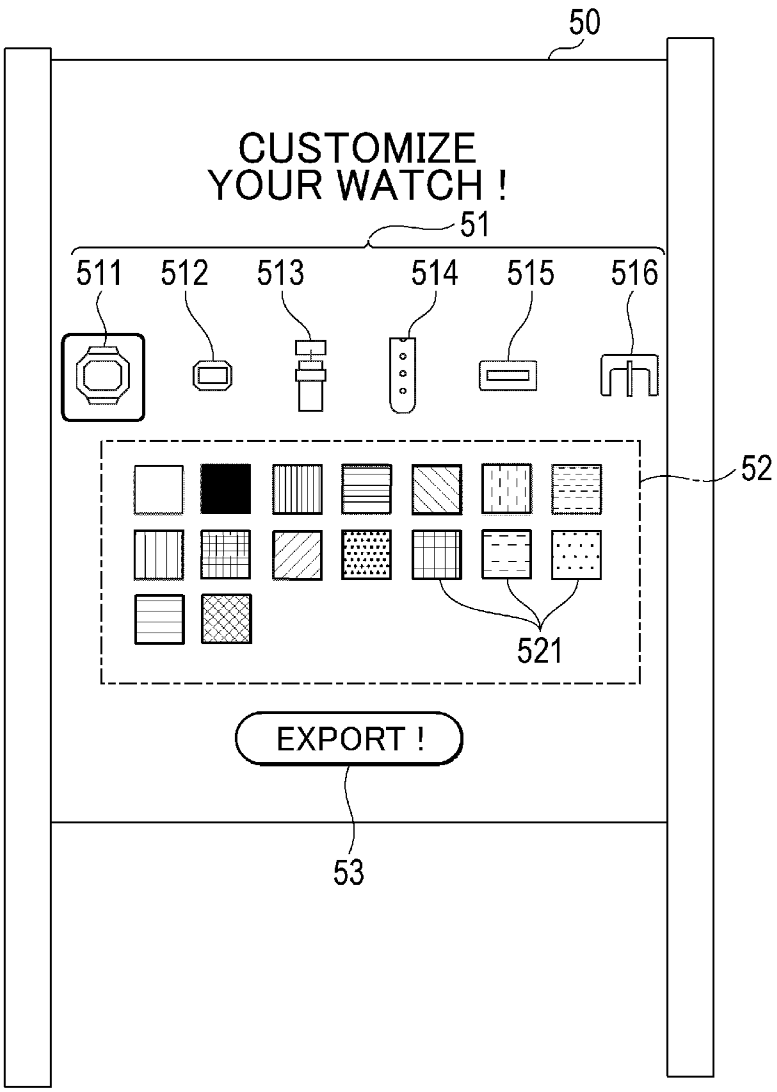
FIG. 8 is a view illustrating a customization IF.

FIG. 8 is a view illustrating the customization IF 50.

The customization IF 50 is a plate-shaped object having a standing signboard shape. The customization IF 50 includes a target selection IF 51, a color selection IF 52, and an export button 53.

The target selection IF 51 is an interface configured to select a component which is a customization target from among a plurality of components (a plurality of portions) constituting the watch object. The target selection IF 51 of the present embodiment includes a bezel icon 511 for selecting the bezel 61 of the watch as the customization target, a face icon 512 for selecting the face 62, a short band icon 513 for selecting the short band 63, a long band icon 514 for selecting the long band 64, a free loop icon 515 for selecting the free loop 65, and a buckle icon 516 for selecting the buckle 66. Each of the icons 511 to 516 can be selected using the pointer P described above. In the example illustrated in FIG. 8, one selected icon (here, the bezel icon 511) is surrounded by a frame. However, the display is not limited thereto, and may be performed such that, for example, only a selected icon is lighted on and lights of the remaining icons are turned off.

Note that the components set as the customization target are examples, and components other than the above components may be set as the customization target. For example, a free loop icon corresponding to a triple free loop may be displayed in addition to the free loop icon 515 corresponding to a single free loop, and any free loop icon may be selected such that a shape of the free loop can be selected from the single free loop or the triple free loop.

The color selection IF 52 is an interface configured to designate a color of the component selected by the target selection IF 51. The color selection IF 52 includes a plurality of color palettes 521 each of which corresponds to any of a plurality of colors different from one another. Each of the color palettes 521 can be selected using the pointer P described above. A type of the color palette 521 included in the color selection IF 52 is switched to correspond to the selected icon among the icons 511 to 516 of the target selection IF 51. That is, the color palette 521 of a color preset for the component corresponding to the selected icon is displayed in the color selection IF 52.

A color of a component corresponding to each of the icons 511 to 516 can be changed by selecting any one of the color palettes 521 of the color selection IF 52 in a state in which any one of the icons 511 to 516 is selected in the target selection IF 51. This change of the color of the component is reflected in the sample object 60. That is, in a case where the customization IF 50 is operated by an action of the avatar 40, the information processing apparatus 20 changes a content of the sample object 60 so as to reflect a content of customization of the watch object in accordance with a content of the operation, and transmits image data after the change to the VR headset 31.

In the sample object 60, colors of the respective components are white in a default state at the time of starting customization, and the color of each of the components is changed as needed in response to an operation of the customization IF 50. A design of the sample object 60 in the default state corresponds to, for example, the base design of "TYPE01" in the object data 232 illustrated in FIG. 5. In addition, the sample object 60 is arranged such that the face 62 on which the time is displayed faces a front direction of the virtual store 200 in the default state. In the present embodiment, the front direction of the virtual store 200 is a direction in which a surface of the customization IF 50 provided with the target selection IF 51 and the like is oriented. FIG. 7 illustrates the sample object 60 in the default state.

FIG. 9 is a view illustrating a state in which the bezel icon 511 is selected.

FIG. 9 illustrates a third-person perspective screen 3152 that displays the inside of the virtual store 200 from a third-party perspective for convenience of description. The third-person perspective screen 3152 is an image of the virtual store 200 viewed from a predetermined point on the virtual space 2 different from the perspective of the avatar 40. In other words, the third-person perspective screen 3152 is an image in which the avatar 40 located in the virtual store 200 is displayed together with the virtual store 200. The user can switch between the VR screen 3151 and the third-person perspective screen 3152 by performing a predetermined operation. It is of course possible to perform customization directly on the VR screen 3151. In a case where customization is performed using the VR screen 3151, the user can observe the sample object 60 from any direction by moving the avatar 40 inside the virtual store 200.

In FIG. 9, the bezel icon 511 is selected, and a color of the bezel 61 is designated as red. Accordingly, the color of the bezel 61 of the sample object 60 is colored red.

Figure 10:
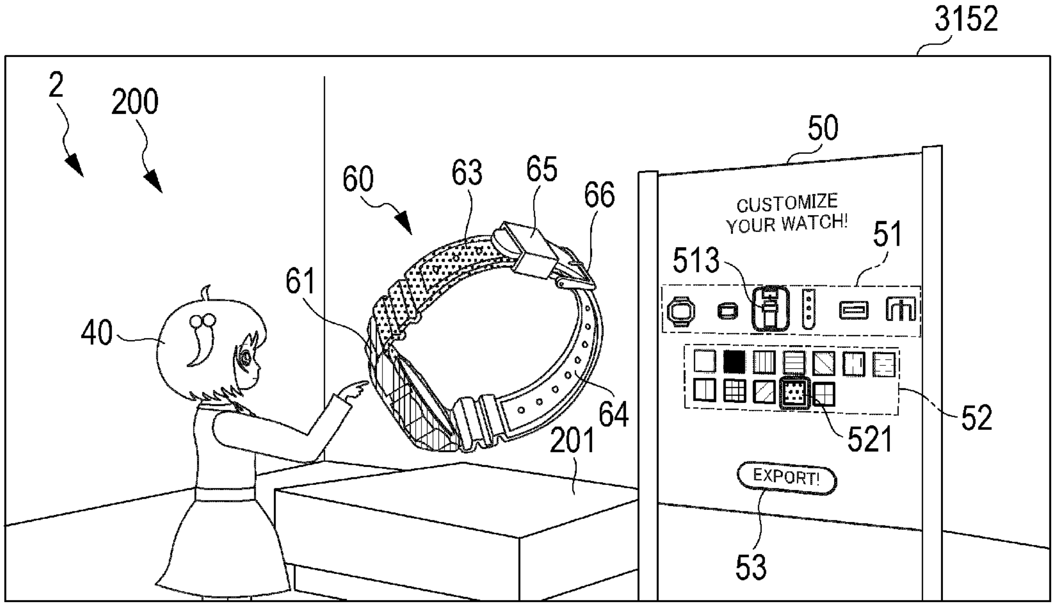
FIG. 10 is a view illustrating a state in which a short band icon is selected.

FIG. 10 is a view illustrating a state in which the short band icon 513 is selected.

When any one of the icons 511 to 516 of the target selection IF 51 is selected, an orientation of the sample object 60 is changed such that the user can easily see a component corresponding to the selected icon. Specifically, when a certain component of the watch object is selected by the target selection IF 51, the information processing apparatus 20 changes an orientation of the sample object 60 such that the component in the sample object 60 faces a reference direction in the virtual store 200 (the virtual space 2), and transmits image data after the change to the VR headset 31. Here, the reference direction is, for example, the front direction in the virtual store 200. In the example illustrated in FIG. 10, the sample object 60 is rotated such that the short band 63 of the sample object 60 faces the front direction in response to the selection of the short band icon 513.

Note that the reference direction may be a direction from a position of the sample object 60 (for example, a position of a representative point of the sample object 60) in the virtual store 200 toward a position of the avatar 40 (for example, a position of a representative point of the avatar 40). For example, the reference direction is set to a direction toward a surface in which a face (any eye of the face) or the like of the avatar 40 is oriented. As a result, when any component in the target selection IF 51 is selected by the avatar 40, the selected component in the sample object 60 is displayed toward the direction of the face of the avatar 40, so that the avatar 40 (user) can customize the watch object in a state in which the selected component is easily visually recognizable. Note that the switching of the reference direction can be changed by operating the operation input unit 314.

In FIG. 10, a color of the short band 63 is designated as yellow in a state in which the short band icon 513 is selected. Accordingly, the color of the short band 63 of the sample object 60 is colored yellow.

Figure 11:
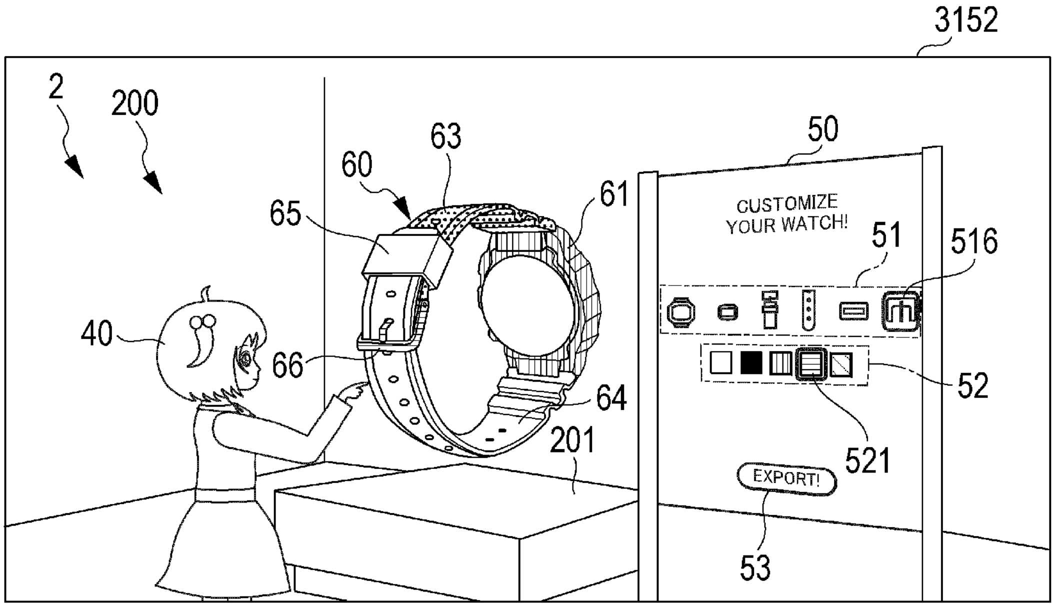
FIG. 11 is a view illustrating a state in which a buckle icon is selected.

FIG. 11 is a view illustrating a state in which the buckle icon 516 is selected.

In FIG. 11, the sample object 60 is rotated such that the buckle 66 of the sample object 60 faces the front direction in response to the selection of the buckle icon 516. In this state, a color of the buckle 66 can be changed by selecting the color palette 521 from the color selection IF 52.

In this manner, the sample object 60 is rotated such that a corresponding component faces the front by selecting each of the icons 511 to 516 of the target selection IF 51, and a color of the component of the sample object 60 can be changed by further selecting the color palette 521 of the color selection IF 52. It is possible to customize a design by repeating this operation to change the color of each of the components of the sample object 60.

In other words, in a case where the customization IF 50 is operated by the avatar 40, settings related to the watch object are changed such that the watch object is customized in accordance with a content of the operation. For example, new row data (customization target data 2321 illustrated in FIG. 5) related to the watch object as the customization target may be generated in the object data 232 at the start of customization, and the color setting of the components such as the "bezel color" may be changed in the customization target data 2321. In addition, an existing design of the watch object can be changed by the above-described operation. In this case, a setting of row data related to the existing design of the watch object in the object data 232 may be changed. Alternatively, at this stage, a setting value of the sample object 60 in the object data 232 may be changed in accordance with a content of customization such that the setting value of the sample object 60 is reflected in row data of a new watch object when the watch object is newly generated.

A design can be customized by a plurality of the users in cooperation. In this case, the plurality of users log in, and a plurality of the avatars 40 corresponding to the plurality of users enter the virtual store 200. Information related to an action of each of the avatars 40 in response to an operation of each of the users is transmitted from each of the information processing apparatuses 20 to the information processing apparatus 20 of another user directly or via the server 10. As a result, the actions of the plurality of avatars 40 corresponding to the plurality of users are shared among the information processing apparatuses 20 of the respective users. Each of the users can visually recognize the avatar 40 of another user on the VR screen 3151 (or the third-person perspective screen 3152).

In a case where customization is performed by the plurality of users in cooperation, customization in accordance with a content of each operation is sequentially reflected in the sample object 60 when the customization IFs 50 are operated by actions of two or more avatars 40 different from each other among the plurality of avatars 40. That is, the settings related to the watch object are changed such that customization in accordance with the content of each of the operations by the plurality of avatars 40 is performed for one watch object. As a result, a design of one watch object can be created by the plurality of users while confirming a status of the components customized by another user.

In this case, the reference direction in which a corresponding component of the sample object 60 is oriented in response to the selection of each of the icons 511 to 516 may be a direction toward one avatar 40 corresponding to a certain user. The one avatar 40 may be, for example, the avatar 40 having entered the virtual store 200 first, or the avatar 40 having entered the virtual store 200 last. Alternatively, whenever each of the icons 511 to 516 is selected, a corresponding component of the sample object 60 may be made to face the avatar 40 that has selected each of the icons 511 to 516. In addition, the above-described reference direction may be a direction toward the avatar 40 having the closest distance to the sample object 60 among the plurality of avatars 40. As a result, even in a case where the plurality of avatars 40 are located in the virtual store 200, a direction of a selected component is changed toward the avatar 40 closest to the sample object 60, so that it is possible to suppress the sample object 60 from being hidden by the other avatar 40 and being difficult to see. In addition, in the above-described manner, a design of one watch object can be efficiently created by the plurality of avatars 40 (users) even in a case where a certain avatar 40 has a role of operating the customization IF 50 and another avatar 40 has a role of confirming customization of the sample object 60.

Note that it is also possible for each of the users to perform customization separately from each other in a case where the plurality of avatars 40 corresponding to the plurality of users has entered the virtual store 200. In this case, a content of self-customization is reflected in the sample object 60, and a content of customization performed by another user is not reflected in the sample object 60. Each time a different avatar 40 enters the virtual store 200, the sample object 60 corresponding to each of the avatars 40 may be additionally displayed. As a result, statuses of watch objects respectively customized by the plurality of avatars 40 located in the virtual store 200 can be shared by the plurality of avatars 40 (users).

After the design customization is performed as described above, the export button 53 is selected (the avatar 40 performs a predetermined operation) so that a watch object 70 (product object) having the customized design is generated in the virtual space 2.

Figure 12:
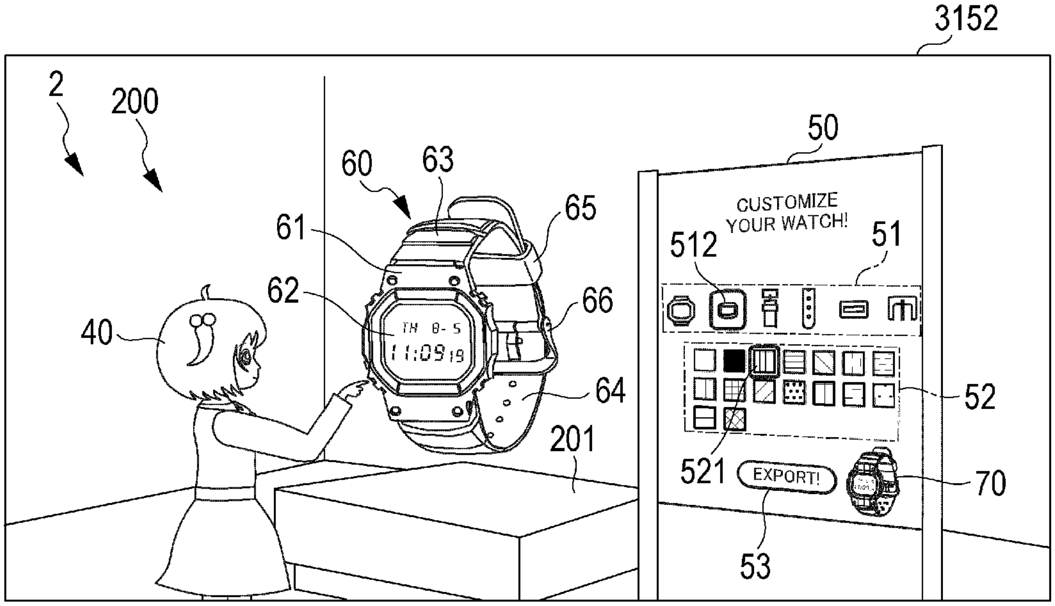
FIG. 12 is a view illustrating a state in which a watch object is generated in response to selection of an export button.

FIG. 12 is a view illustrating a state in which the watch object 70 is generated in response to the selection of the export button 53.

When the export button 53 is selected, the watch object 70 having the same design as the sample object 60 at that time is generated in the vicinity of the export button 53 and displayed (output). In addition, in response to the generation of the watch object 70, the sample object 60 returns to a color scheme in the default state illustrated in FIG. 7.

When the avatar 40 performs a predetermined action, the generated watch object 70 is held or worn on any region of the plurality of regions of the avatar 40. When the avatar 40 holding or wearing the watch object 70 acts in the virtual space 2, a position and an orientation of the watch object 70 in the virtual space 2 follow a position and an orientation of the wearing region of the avatar 40. For example, when the avatar 40 performs an action of twisting a wrist with the watch object 70 being worn on the wrist, the watch object 70 also rotates in accordance with the action.

<Operation Related to Adjustment of Watch Object>

In the present embodiment, in a case where the avatar 40 performs an action of holding or wearing the watch object 70 (that is, a case where the user performs an operation for causing the avatar 40 to perform the action of holding or wearing the watch object 70), settings related to at least one of a size and a shape of the watch object 70 in the virtual space 2 is automatically adjusted in accordance with a feature of the avatar 40. Note that the settings related to at least one of the size and shape of the watch object 70 may be changed when the avatar 40 wears the watch object 70 without changing the settings related to the size and shape of the watch object 70 when the avatar 40 holds the watch object 70.

The user operation for causing the avatar 40 to perform an action of holding the watch object 70 is not particularly limited, but may be, for example, a predetermined grab operation for gripping a target performed by the controller 32 in a state in which a hand of the avatar 40 is within a predetermined distance from the watch object 70. The user operation for causing the avatar 40 to perform an action of wearing the watch object 70 is not particularly limited, but may be, for example, a predetermined wearing operation for wearing a target performed by the controller 32 in a state in which the avatar 40 holds the watch object 70.

For example, the setting related to the size of the watch object in the virtual space 2 is adjusted in accordance with a size of the avatar 40 in the virtual space 2.

Specifically, a setting value of the "display magnification correction" of the object data 232 illustrated in FIG. 5 is adjusted in accordance with a setting value of the "total length" or the "wrist maximum diameter" in the "avatar information" of the user management data 132 illustrated in FIG. 3.

As an example, the watch object 70 is enlarged or reduced (the setting value of the "display magnification correction" is adjusted) such that a maximum width of the watch object 70 in the virtual space 2 becomes a length depending on the "total length" of the avatar 40 in the virtual space 2.

Alternatively, the setting ("display magnification correction") related to the size of the watch object 70 in the virtual space 2 is adjusted in accordance with the size ("wrist maximum diameter" in the present embodiment) of the region on which the watch object 70 is to be held or worn among the plurality of regions of the avatar 40. For example, in a case where a band of the watch object 70 is cylindrical, the "display magnification correction" is adjusted such that an inner diameter of the band coincides with the "wrist maximum diameter" of the avatar 40.

In addition, the setting related to the shape of the watch object 70 may be adjusted so as to match a shape of the region on which the watch object 70 is to be worn among the plurality of regions of the avatar 40.

Specifically, a setting value of the "shape correction" of the object data 232 is changed in accordance with a setting value of the "wrist shape" in the "avatar information" of the user management data 132. For example, if the "wrist shape" of the avatar 40 is "cylinder", the "shape correction" of the watch object 70 is set to "cylinder" accordingly. If the "wrist shape" of the avatar 40 is "elliptical cylinder", the "shape correction" of the watch object 70 is set to "elliptical cylinder" accordingly.

Figure 13:
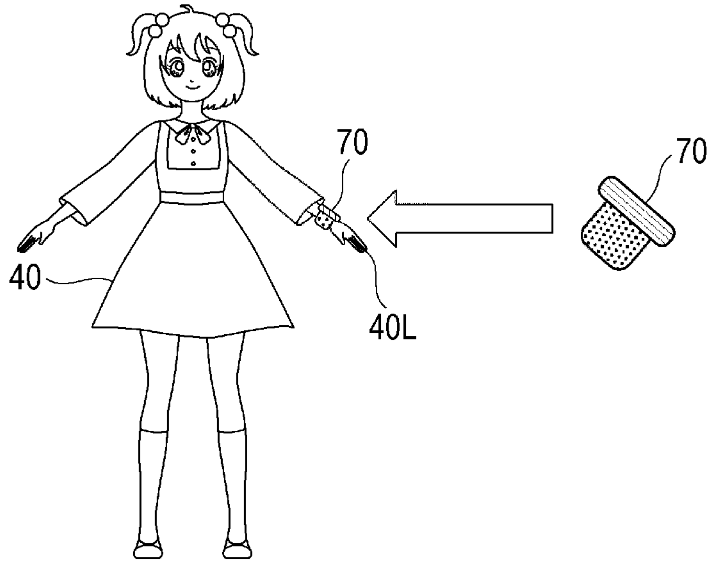
FIG. 13 is a view illustrating a state in which the watch object is worn on a typical human-shaped avatar.

FIG. 13 is a view illustrating a state in which the watch object 70 is worn on the avatar 40 having a typical human shape.

Figure 14:
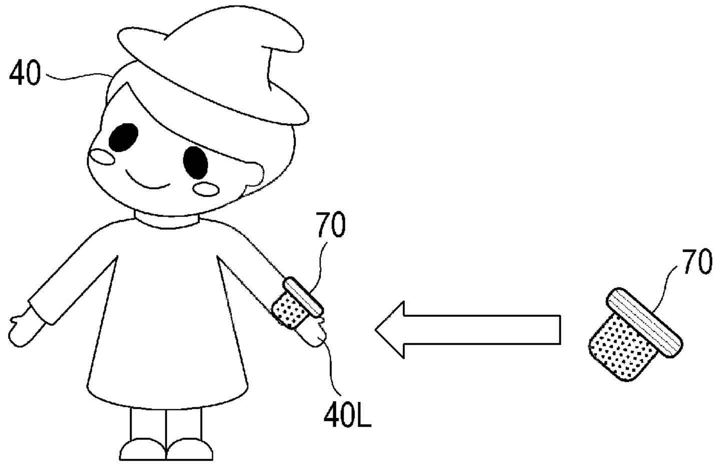
FIG. 14 is a view illustrating a state in which the watch object is worn on a two-head-tall character avatar.

FIG. 14 is a view illustrating a state in which the watch object 70 is worn on the avatar 40 of a two-head-tall character.

Figure 15:
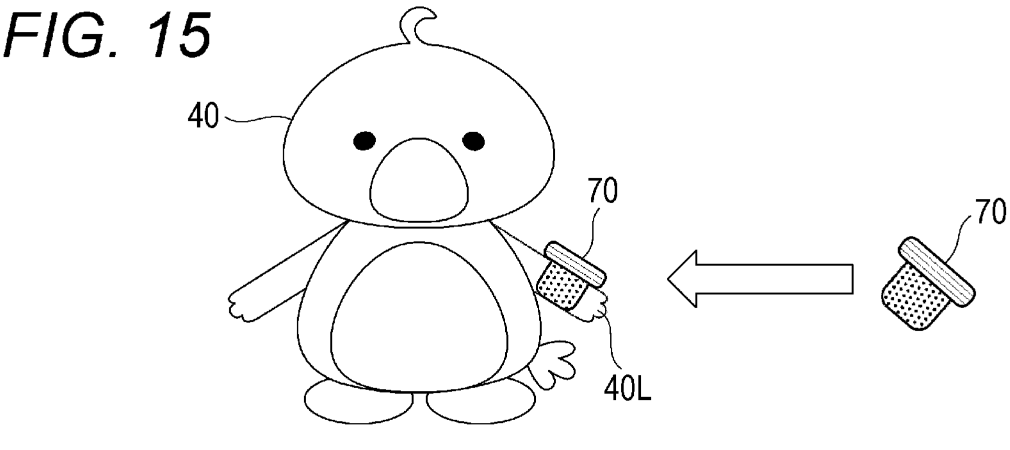
FIG. 15 is a view illustrating a state in which the watch object is worn on an animal avatar.

FIG. 15 is a view illustrating a state in which the watch object 70 is worn on the avatar 40 of an animal.

As illustrated in FIGS. 14 and 15, the avatar 40 is not necessarily a typical human-shaped character. Therefore, there are various sizes and shapes of regions (wrists) on which the watch object 70 is to be worn. In the present embodiment, at least one of the size and shape of the watch object 70 is automatically adjusted in accordance with such various features of the avatars 40.

The watch object 70 in the default state (in which the "display magnification correction" is "1") generated in response to selection of the export button 53 is illustrated on the right side in FIGS. 13 to 15. A maximum diameter of a wrist of each of the avatars 40 in FIGS. 13 to 15 is smaller than an inner diameter of the band of the watch object 70 in the default state. Therefore, in a case where the watch object 70 is worn on the wrist of any of the avatars 40, the watch object 70 is reduced from the default state. A reduction ratio at this time is adjusted in accordance with the size (maximum diameter) of the wrist of the avatar 40. The size of the wrist is the smallest in the human-shaped avatar 40 in FIG. 13, and becomes larger in the order of the two-head-tall character avatar 40 in FIG. 14 and the animal avatar 40 in FIG. 15. Thus, a value of the "display magnification correction" after the adjustment is the smallest in the case of being worn on the avatar 40 in FIG. 13, and is the largest in the case of being worn on the avatar 40 in FIG. 15.

In a case where the wrist of the avatar 40 (or a region corresponding to the wrist) is not a cylinder but an elliptical cylinder or flat (for example, in the case of the avatar 40 in which a flat wing corresponds to the wrist, such as a penguin), the setting of the "shape correction" is adjusted in accordance with the shape of the wrist of the avatar 40.

Note that the watch object 70 may be worn on a region (for example, a head, a torso, or the like) other than the wrist in the case of the avatar 40 of an animal type in which a wrist cannot be objectified or the like. In this case, the size and shape of the watch object 70 are adjusted in accordance with a size and a shape of the region on which the watch object 70 is to be worn. In addition, the watch object 70 may be worn on a region (a head, a torso, an ankle, or the like) other than the wrist even in the case of the avatar 40 such as a human shape in which the wrist can be objectified.

In addition, when the user has performed an operation for holding or wearing the watch object 70 on the avatar 40, the size and/or shape of the watch object 70 may be adjusted in accordance with features (size and/or shape) of a region of the avatar 40 closest to the watch object 70. As an example, the size and/or shape of the watch object 70 may be adjusted in accordance with the wrist in a case where the region of the avatar 40 closest to the watch object 70 is the wrist, and the size and/or shape of the watch object 70 may be adjusted in accordance with the head in a case where the region of the avatar 40 closest to the watch object 70 is the head.

In addition, the adjustment of the size and/or shape of the watch object 70 is performed without being limited to a case where the operation for holding or wearing the watch object 70 by the avatar 40 is performed. For example, the size and/or shape of the watch object 70 may be adjusted in a case where an operation for causing the avatar 40 to perform an action of generating the watch object 70 (that is, an action of selecting the export button 53) is performed. Specifically, in a case where the export button 53 is selected by the human-shaped avatar 40 in FIG. 13, the watch object 70 generated and displayed in the vicinity of the export button 53 in FIG. 12 is output (displayed) in a state of being adjusted to a size and a shape of a region to be held or worn on the human-shaped avatar 40. In addition, in a case where the export button 53 is selected by the animal avatar 40 in FIG. 15, the watch object 70 generated and displayed in the vicinity of the export button 53 is output (displayed) in a state of being adjusted to a size and a shape of a region to be held or worn on the animal avatar 40. That is, the size and shape of the generated watch object 70 are adjusted in accordance with the avatar 40 that has selected the export button 53. Note that, in this case, information (an avatar ID or the like) of the avatar 40 that has selected the export button 53 may be transmitted from the VR device 30 to the information processing apparatus 20. In this manner, in FIG. 12, the size and shape of the watch object 70 to be output (displayed) in the customization IF 50 in a case where the avatar 40 has selected the export button 53 can be made different in accordance with the type of the avatar 40.

In addition, a mirror may be provided on a part of a wall surface of the virtual store 200 (alternatively, a part of the wall surface can be changed to the mirror by the user operation), and the avatar 40 appearing in the mirror may appear in the VR screen 3151 by viewing the mirror from the perspective of the avatar 40. As a result, the user can visually recognize the avatar 40 and the watch object 70 also on the VR screen 3151.

<Operation Related to Generation of Duplicate Object>

Although the sample object 60 that is white in the default state illustrated in FIG. 7 is used as a base model of customization in the above description, the base model may be selected by the user without being limited thereto.

For example, the same watch object 70 as the watch object 70 that is being worn by the avatar 40 that is being located in the virtual store 200 among the plurality of avatars 40 corresponding to the plurality of users, or the same watch object 70 as the watch object 70 worn by the avatar 40 located in the virtual store 200 in the past among the plurality of avatars 40 in the virtual store 200 may be selectable as a customization target.

In this case, duplicate objects 80, obtained by duplicating at least one of the watch object 70 that is being worn by the avatar that is being located in the virtual store 200 among the plurality of avatars 40 and the watch object 70 worn in the virtual store 200 by the avatar 40 located in the virtual store 200 in the past among the plurality of avatars 40, may be generated and displayed (installed) in the virtual store 200 such that the same watch object 70 as any of the duplicate objects 80 is selectable as a customization target.

Figure 16:
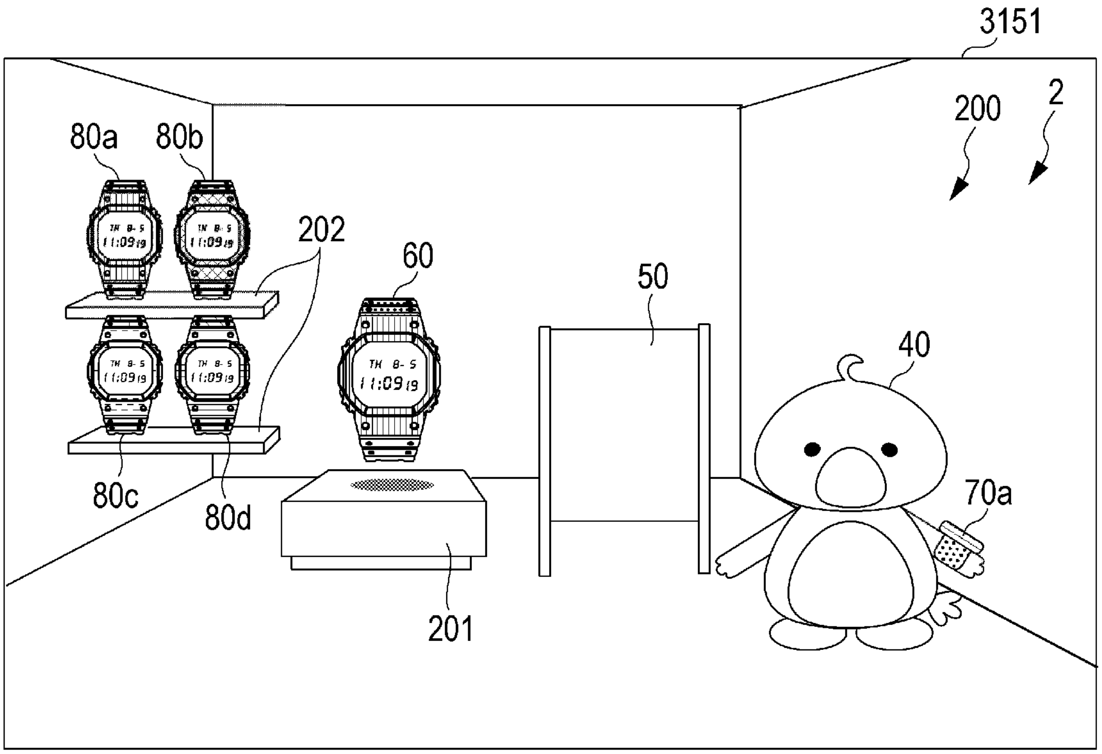
FIG. 16 is a view illustrating a virtual store in which duplicate objects are displayed.

FIG. 16 is a view illustrating the virtual store 200 in which the duplicate objects 80 are displayed.

The animal avatar 40 corresponding to another user has entered the virtual store 200 illustrated in FIG. 16. A duplicate object 80*a* obtained by duplicating a watch object 70*a* that is being worn by the animal avatar 40 is displayed on shelves 202 located on the left side in the virtual store 200. In addition, duplicate objects 80*b*, 80*c*, and 80*d* of watch objects 70*b*, 70*c*, and 70*d* (not illustrated) worn in the virtual store 200 by the other avatars 40 who entered the virtual store 200 in the past are also displayed on the shelves 202.

When the user selects one of the duplicate objects 80*a* to 80*d* using the pointer P, the selected duplicate object 80 is used as the base model of customization. In response to the selection of the base model, a code corresponding to the selected duplicate object 80*a* is input to the "base design" of the customization target data 2321 illustrated in FIG. 5. Here, it is assumed that the duplicate object 80*a* is selected as the base model. When the base model is selected, a design of the base model (the duplicate object 80*a*) is reflected on the sample object 60 as illustrated in FIG. 16. Customization based on the duplicate object 80*a* can be performed by operating the customization IF 50 in this state.

Note that the duplicate object 80 is not limited to the duplicate of the watch object 70 that is currently being worn (or that was worn in the past) by the avatar 40 of another user. For example, a duplicate of the watch object 70 currently being worn by the user's own avatar 40 may be used as the duplicate object 80. Alternatively, duplicates of a predetermined number of watch objects 70 generated most recently (last) in the virtual store 200 may be used as the duplicate objects 80. Alternatively, the duplicate object 80 for the watch object 70 prepared (customized) in advance by a user (an individual or an organization such as a company) who manages the running of the virtual store 200 may be used. These duplicate objects 80 may also be used as the base model of customization.

In the duplicate objects 80 displayed on the shelves 202 in the virtual store 200, the duplicate of the watch object 70 that is being worn (or was worn) by the avatar 40 and the duplicate of the watch object 70 prepared by the user who manages the running of the virtual store 200 may be lined up on the shelves 202. When these two types of duplicates are displayed on the shelves 202, the respective types of duplicates may be placed on different shelves 202, respectively.

In addition, each of the users may be able to select whether to permit duplication of the watch object 70 worn by the user's own avatar 40.

<Operation Related to Order and Production of Watch in Real World>

In the virtual store service of the present embodiment, a watch having a content (for example, the same design) corresponding to the watch object 70 customized in the virtual store 200 can be ordered in the real world. For example, the above-described order can be made by the avatar 40 performing a predetermined action (for example, an action of pressing an order button) at an order counter (not illustrated) provided in the virtual store 200. When the order is made, the information processing apparatus 20 transmits an order request to the server 10. The order request includes, for example, a model of the ordered watch, a content of customization, information of a user corresponding to the avatar 40 that has made the order, and the like. The processing of transmitting the order request to the server 10 corresponds to "processing for ordering a product in the real world".

The server 10 performs processing for producing and shipping the watch to the user in the real world on the basis of the received order request.

In addition, production of the watch in the real world may be linked to generation of the watch object 70 in the virtual space 2. That is, the generation of the watch object 70 in the virtual space 2 may be started in response to the start of the production of the ordered watch in the real world. In addition, the watch object 70 generated in the virtual space 2 may be provided to the avatar 40 as the ordered watch is shipped to the user in the real world.

In these cases, the watch object (hereinafter referred to as a “linkage production watch object”) generated in linkage with the real world watch may be distinguished from the watch object 70 generated by the export button 53 in the virtual store 200. For example, the watch object 70 generated by the export button 53 may be a prototype object that can be held and worn by the avatar 40 only inside the virtual store 200 in the virtual space 2, and the linkage production watch object may be an object that can be held and worn by the avatar 40 at any position in the virtual space 2 regardless of the inside and outside of the virtual store 200. The linkage production watch object is also an aspect of the “product object”.

Note that, in a case where the avatar 40 has exited the virtual store 200 in a state in which the avatar 40 holds and wears the watch object 70 generated by the export button 53, this watch object 70 may be automatically brought into a state of not being held and worn by the avatar 40.

In addition, in order to distinguish between the watch object 70 generated by the export button 53 and the linkage production watch object, information (for example, 0 for the watch object 70 and 1 for the linkage production watch object) that can distinguish these may be provided as a sub-item in the row data of the object data 232.

In addition, in a case where the linkage production watch object is generated in linkage with the real world watch, a virtual factory for generating the linkage production watch object may be provided in the virtual space 2 such that the process of generating the linkage production watch object in the virtual factory can be viewed through the avatar 40.

In this case, when a production instruction according to a written order for producing the ordered watch is input on a real system in a production factory in the real world, the same production instruction may be input also in the virtual factory in the virtual space 2 to start the generation of the linkage production watch object.

In addition, when a shipping instruction according to a written order for shipping the ordered watch is input on the real system in the production factory in the real world, the same shipping instruction may be input also in the virtual factory in the virtual space 2 to provide the avatar 40 with the linkage production watch object.

<Virtual Store Running Processing>

Next, virtual store running processing executed in the information processing system 1 to realize the operations related to the virtual store service will be described. Hereinafter, description will be given focusing on processing executed by the CPU 21 of the information processing apparatus 20 in the virtual store running processing.

Figure 17:
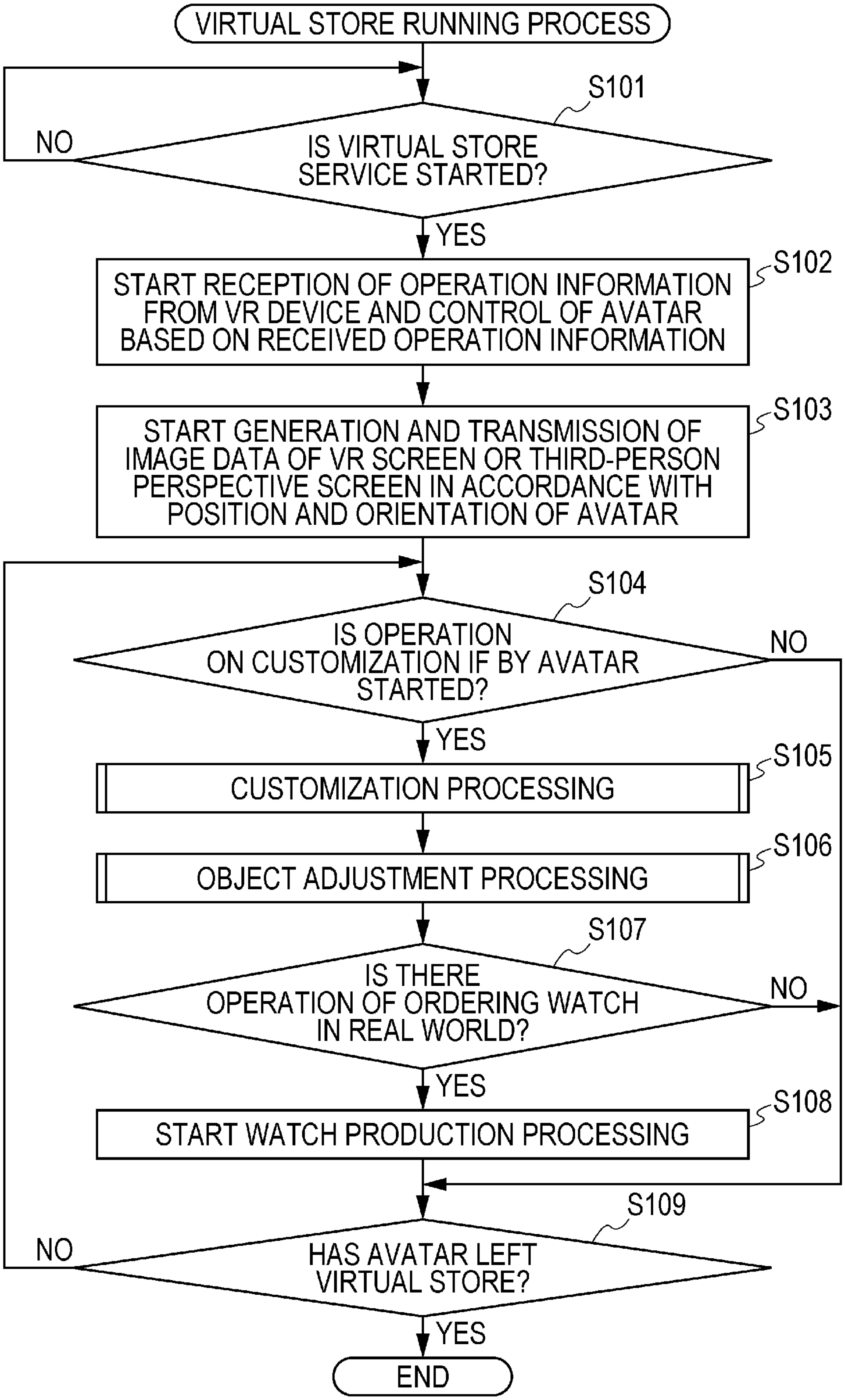
FIG. 17 is a flowchart illustrating a control procedure of virtual store running processing.

FIG. 17 is a flowchart illustrating a control procedure of virtual store running processing;

When the virtual store running processing is started, the CPU 21 of the information processing apparatus 20 determines whether a user logs in and the virtual store service is started (step S101). In a case where it is determined that the virtual store service is not started (“NO” in step S101), the CPU 21 executes step S101 again.

In a case where it is determined that the virtual store service is started (“YES” in step S101), the CPU 21 starts reception of operation information related to an operation of the user from the VR device 30 and control of the avatar 40 in the virtual space 2 based on the received operation information (step S102). In addition, the CPU 21 starts generation of image data of the VR screen 3151 or the third-person perspective screen 3152 in accordance with a position and an orientation of the avatar 40, and transmission of the image data to the VR headset 31 (step S103). In each of the following steps, the control of the avatar 40 based on operation information, and the generation of image data of the VR screen 3151 or the third-person perspective screen 3152 and the transmission of image data to the VR headset 31 are continuously performed, but description of these processes is omitted for convenience.

The CPU 21 determines whether an operation on the customization IF 50 by the avatar 40 is started (step S104). In a case where it is determined that the operation of the customization IF 50 is not started (“NO” in step S104), the CPU 21 shifts the processing to step S109. In a case where it is determined that the operation of the customization IF 50 is started (“YES” in step S104), the CPU 21 starts customization processing (step S105).

Figure 18:
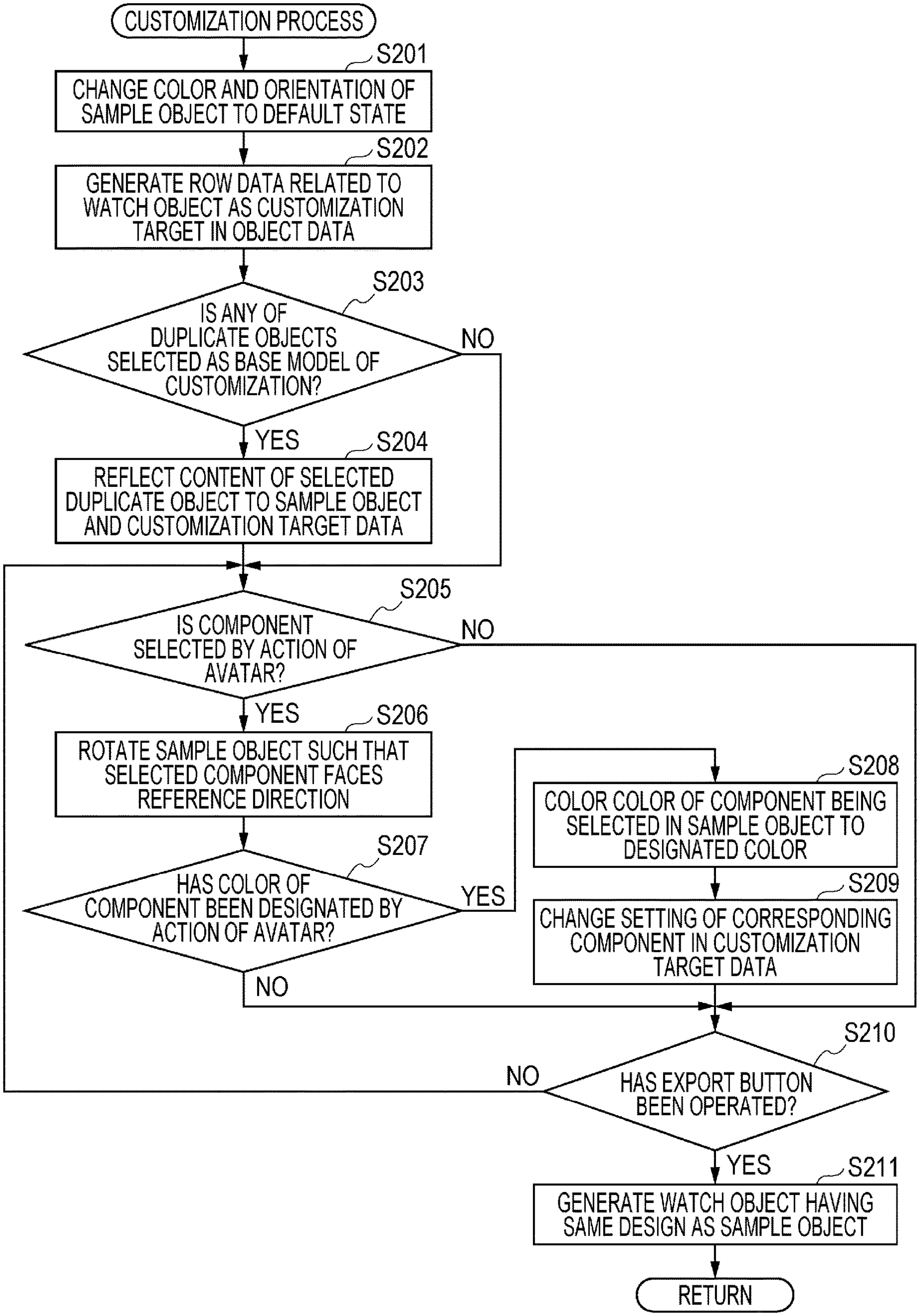
FIG. 18 is a flowchart illustrating a control procedure of customization processing.

FIG. 18 is a flowchart illustrating a control procedure of customization processing;

When the customization processing is called, the CPU 21 changes a color and an orientation of the sample object 60 to the above-described color and orientation in the default state (step S201). In addition, the CPU 21 generates the customization target data 2321 (row data) related to the watch object 70 as a customization target in the object data 232 (step S202). The customization target data 2321 corresponds to row data related to the watch object 70 scheduled to be generated in step S211 to be described later.

The CPU 21 determines whether any of the duplicate objects 80 is selected as the base model of customization (step S203). In a case where it is determined that any of the duplicate objects 80 is selected as the base model of customization (“YES” in step S203), the CPU 21 reflects a content (here, a color of each component) of the selected duplicate object 80 on the sample object 60 (step S204). In step S204, the CPU 21 reflects the content of the selected duplicate object 80 in the customization target data 2321 generated in step S202. That is, the CPU 21 changes a color setting of each component in the customization target data 2321 to the color of each component of the duplicate object 80.

In a case where step S204 ends, or in a case where it is determined in step S203 that none of the duplicate objects 80 are selected as the base model of customization (“NO” in step S203), the CPU 21 determines whether a component as a customization target is selected by an action of the avatar 40 selecting any of the icons 511 to 516 of the target selection IF 51 (step S205). In a case where it is determined that the component is selected (“YES” in step S205), the CPU 21 rotates the sample object 60 such that the selected component faces the reference direction (step S206).

The CPU 21 determines whether a color of the component has been designated by an action of the avatar 40 selecting any of the color palettes 521 in the color selection IF 52 (step S207). In a case where it is determined that the color of the component has been designated (“YES” in step S207), the CPU 21 colors a color of the component being selected in the sample object 60 to the designated color (step S208). In addition, the CPU 21 changes a color setting of a corresponding component in the customization target data 2321 generated in step S202 (step S209). This step S209 corresponds to “processing of changing a setting related to a product object to make the product object be customized”.

In a case where step S209 ends, the CPU 21 causes the processing to proceed to step S210. In addition, the CPU 21 causes the processing to proceed to step S210 also in a case where it is determined in step S205 that no component is selected ("NO" in step S205) and in a case where it is determined in step S207 that the color of the component has not been designated ("NO" in step S207). In step S210, the CPU 21 determines whether the export button 53 has been operated by the avatar 40, and returns the processing to step S205 in a case where it is determined that the export button 53 has not been operated ("NO" in step S210).

In a case where it is determined that the export button 53 has been operated ("YES" in step S210), the CPU 21 generates the watch object 70 having the same design as the sample object 60 at that time on the basis of the customization target data 2321 at that time, and displays (outputs) the watch object 70 at a predetermined position (step S211).

Note that the customization target data 2321 is generated in step S202, settings thereof are sequentially changed in response to the operation on the customization IF 50, and the watch object 70 is generated on the basis of the customization target data 2321 in step S211 in the above description, but the following processing may be performed instead. That is, color settings of components in the row data of the sample object 60 in the object data 232 may be sequentially changed in response to the operation of the customization IF 50, and the watch object 70 (and the customization target data 2321) having a content reflecting the settings of the row data of the sample object 60 at that time may be generated in step S211.

When step S211 ends, the CPU 21 ends the customization processing and returns the processing to the virtual store running processing of FIG. 17.

When the customization processing (step S105) ends in FIG. 17, the CPU 21 executes object adjustment processing (step S106).

Figure 19:
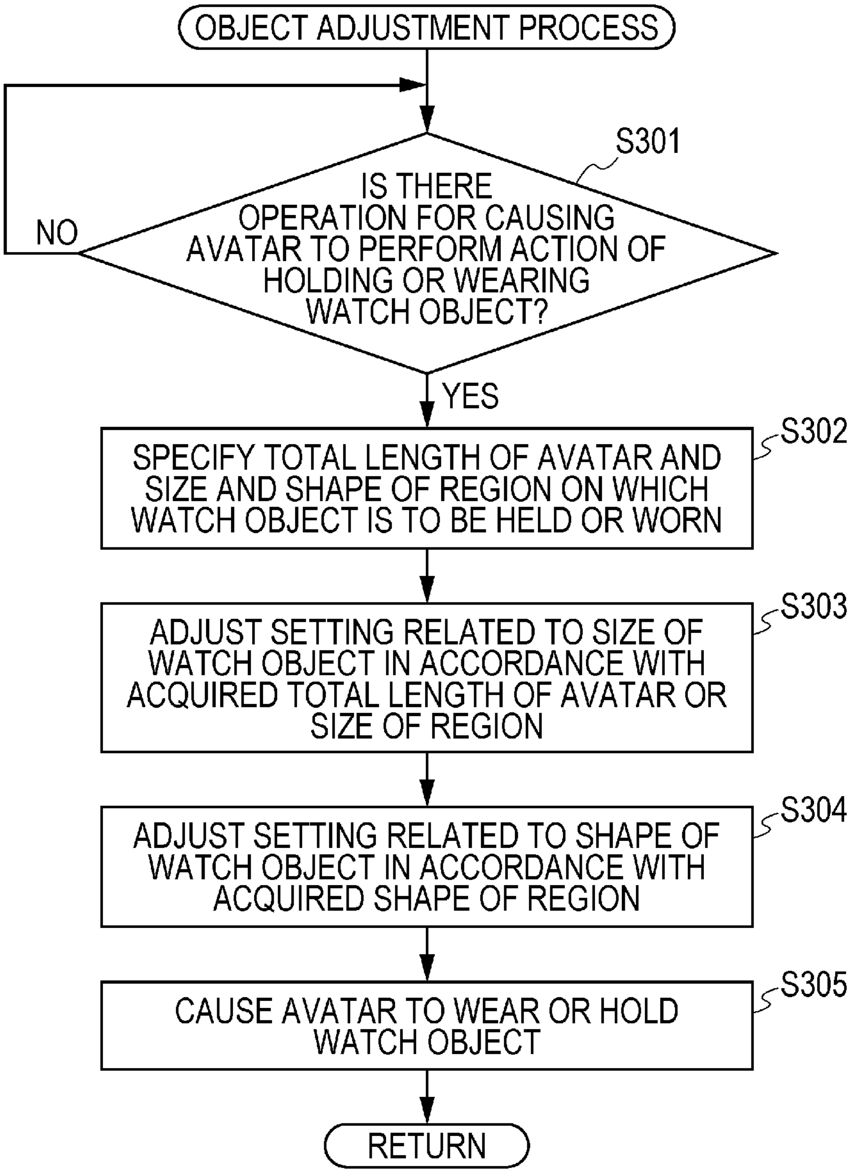
FIG. 19 is a flowchart illustrating a control procedure of object adjustment processing.

FIG. 19 is a flowchart illustrating a control procedure of object adjustment processing;

When the object adjustment processing is called, the CPU 21 determines whether an operation for causing the avatar 40 to perform an action of holding or wearing the watch object 70 has been performed by the user (step S301). In a case where it is determined that the operation has been performed ("YES" in step S301), the CPU 21 specifies a total length of the avatar 40 and a size and a shape of a region on which the watch object 70 is to be held or worn (step S302). Here, the CPU 21 acquires the "avatar information" (the "total Length", the "wrist maximum diameter", and the "wrist shape") of the user management data 132 illustrated in FIG. 3 from the server 10, and specifies the size and shape of the region on the basis of the acquired information. Alternatively, in a case where the "avatar information" of the user management data 132 is acquired in advance and recorded in the object data 232, the CPU 21 specifies the size and shape of the region with reference to the object data 232. Note that one of the "total length" and the "wrist maximum diameter" may be acquired and used in the next step S303.

The CPU 21 adjusts a setting related to the size of the watch object 70 (the "display magnification correction" in the object data 232 of FIG. 5) in accordance with the total length of the avatar 40 or the size of the region acquired in step S302 (step S303). In addition, the CPU 21 adjusts a setting related to the shape of the watch object 70 (the "shape correction" in the object data 232) in accordance with the shape of the region acquired in step S302 (step S304). Note that, step S303 is omitted in a case where a default size of the watch object 70 is appropriate for the size of the region of the avatar 40. In addition, step S304 is omitted in a case where a default shape of the watch object 70 is appropriate for the shape of the region of the avatar 40.

The CPU 21 causes the avatar 40 to hold or wear the watch object 70 whose settings related to the size and/or shape has been adjusted (step S305). Here, the CPU 21 records an avatar ID and the wearing (holding) region of the avatar 40 as a wearing (holding) target in the "wearing target avatar" in the object data 232 in FIG. 5. When step S305 ends, the CPU 21 ends the object adjustment processing and returns the processing to the virtual store running processing of FIG. 17.

When the object adjustment processing (step S106) ends in FIG. 17, the CPU 21 determines whether an operation for ordering a watch in the real world has been performed (step S107). In a case where it is determined that the operation has not been performed ("NO" in step S107), the CPU 21 shifts the processing to step S109. In a case where it is determined that the operation has been performed ("YES" in step S107), the CPU 21 starts watch production processing to be described later (step S108).

When step S108 ends, the CPU 21 determines whether the avatar 40 has left the virtual store 200 (step S109). In a case where it is determined that the avatar 40 has not left the virtual store 200 ("NO" in step S109), the CPU 21 returns the processing to step S104. In a case where it is determined that the avatar 40 has left the virtual store 200 ("YES" in step S109), the CPU 21 ends the virtual store running processing.

Figure 20:
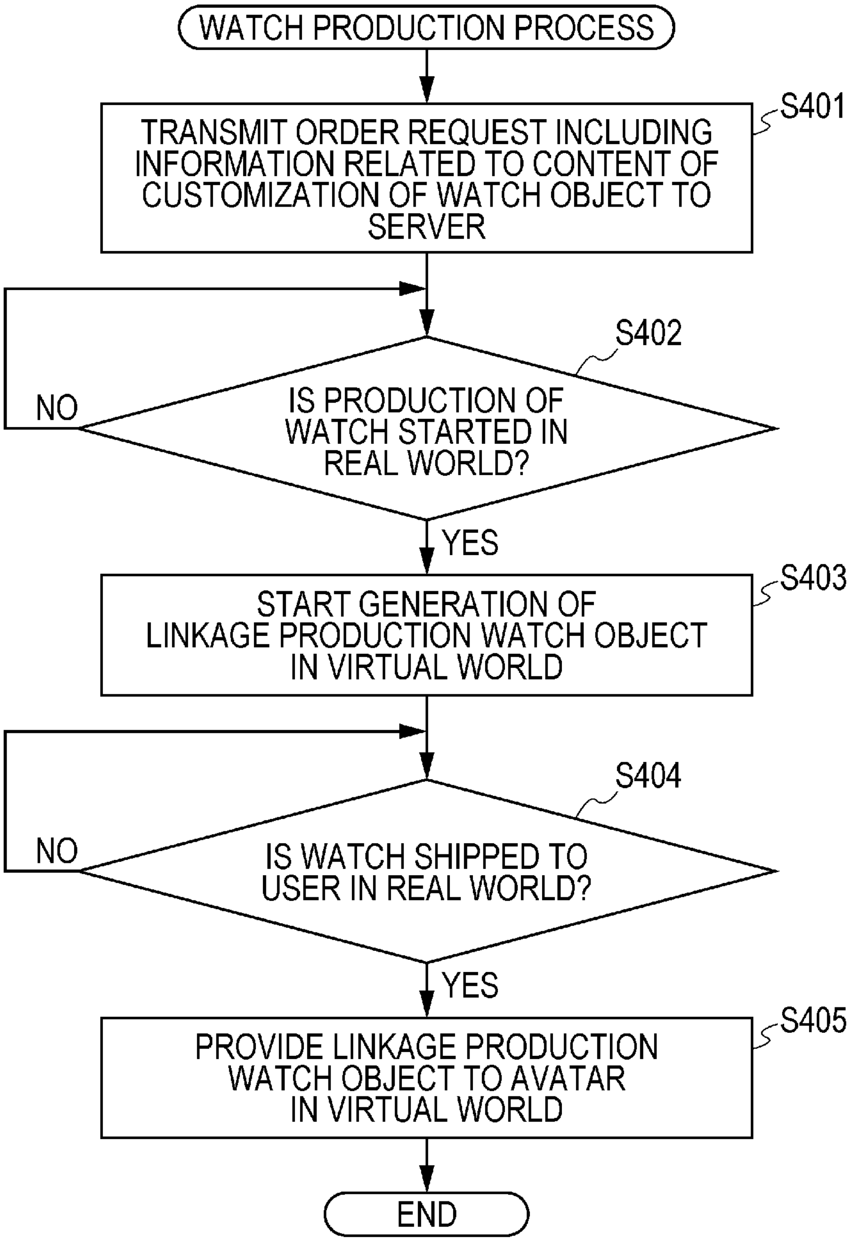
FIG. 20 is a flowchart illustrating a control procedure of watch production processing.

FIG. 20 is a flowchart illustrating a control procedure of watch production processing;

When the watch production processing is started, the CPU 21 transmits the above-described order request including information related to a content of customization of the ordered watch to the server 10 (step S401). The server 10 performs processing for producing and shipping the watch to the user in the real world on the basis of the received information. In addition, the server 10 appropriately transmits information related to a progress status of the watch production process in the real world to the information processing apparatus 20. For example, in a case where the production of the watch is started in the real world, the server 10 transmits production start information to the information processing apparatus 20. In addition, in a case where the watch is shipped to the user in the real world, the server 10 transmits shipping information to the information processing apparatus 20.

The CPU 21 determines whether the production of the watch is started in the real world on the basis of whether the production start information is received (step S402). In a case where it is determined that the production of the watch is not started in the real world ("NO" in step S402), the CPU 21 executes step S402 again. In a case where it is determined that the production of the watch is started in the real world ("YES" in step S402), the CPU 21 starts generation of a linkage production watch object in the virtual space 2 (for example, in the virtual factory described above) (step S403).

The CPU 21 determines whether the watch is shipped to the user in the real world on the basis of whether the above-described shipping information has been received (step S404). In a case where it is determined that the watch is not shipped to the user in the real world ("NO" in step S404), the CPU 21 executes step S404 again. In a case where it is determined that the watch is shipped to the user in the real world ("YES" in step S404), the CPU 21 provides the linkage production watch object to the avatar 40 in the virtual space 2 (step S405). The processing in step S405 may be processing of causing the linkage production watch object to be worn on a wrist of the avatar 40, or may be processing of adding the linkage production watch object to a list of belongings associated with the avatar 40 to obtain a state where the avatar 40 can wear the linkage production watch object. In addition, similarly to the real world, in a case where the linkage production watch object is shipped from the virtual factory to the avatar 40 also in a virtual world, shipping the linkage production watch object corresponds to providing the linkage production watch object to the avatar 40.

When step S405 ends, the CPU 21 ends the watch production processing.

Modification

Next, a modification of the above embodiment will be described. Hereinafter, differences from the above embodiment will be described, and configurations common to those of the above embodiment will be denoted by common reference signs, and description thereof will be omitted. Hereinafter, a design of the watch object 70 customized by a method of the above embodiment is referred to as a "customized design".

In the present modification, a non-fungible token (hereinafter referred to as "NFT") associated with a part or a whole of the customized design can be registered in association with a user who has performed the customization. The NFT is non-fungible digital data that certifies uniqueness or an owner of digital contents such as an image, a moving image, or a voice by a blockchain technology. The NFT can also be purchased and sold in an NFT marketplace.

Figure 21:
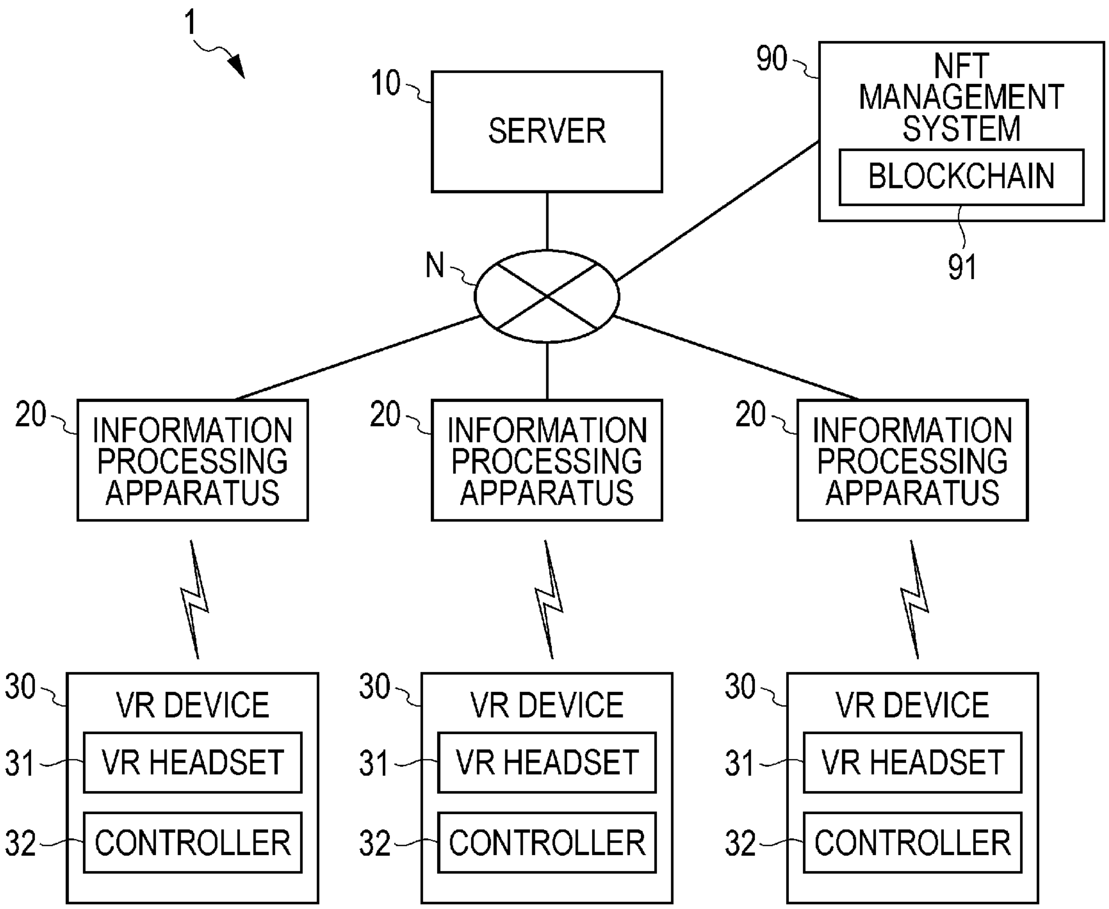
FIG. 21 is a diagram illustrating a configuration of information processing system according to a modification.

FIG. 21 is a diagram illustrating a configuration of the information processing system 1 according to the modification.

The information processing system 1 according to the present modification includes an NFT management system 90 connected to the server 10 and the information processing apparatus 20 via the network N. The NFT management system 90 includes a blockchain 91. The NFT management system 90 manages the NFT by recording information related to the NFT in the blockchain 91. The information related to the NFT includes, for example, information regarding an owner of the NFT, generation date and time of the NFT, and a target object associated with the NFT (the target object whose owner is certified by the NFT, and the customized design of the watch object 70 in the present modification). Note that the NFT management system 90 may perform transmission and reception of information with a blockchain provided outside the information processing system 1 to record the information related to the NFT in the blockchain.

A registration timing of the NFT related to the customized design of the watch object 70 is not particularly limited. As an example, the NFT may be registered in response to an additional instruction from the user at a timing when the watch object 70 whose design has been customized by the method of the above embodiment is generated, a timing when a real world watch having the same design as the watch object 70 is ordered, or the like. In a case where the NFT is to be registered, an NFT registration request is transmitted from the information processing apparatus 20 to the server 10. The registration request includes, for example, information of the customized design related to the generated watch object 70, information for specifying a portion (the part or the whole of the design) of the customized design to be registered in association with the NFT, information of the user who is the owner of the NFT, and the like. The processing of transmitting the NFT registration request to the server 10 corresponds to "processing for registering the NFT in association with the user".

The server 10 causes the NFT management system 90 to register the NFT on the basis of the received registration request, and records the information related to the NFT in association with the user in the user management data 132.

FIG. 22 is a view illustrating a content example of the user management data 132 according to the modification.

The user management data 132 in the present modification includes data of an item of "held NFT information" in addition to a "user ID" and an "avatar ID".

The "held NFT information" includes information related to an NFT held by a user corresponding to row data. Here, the "held NFT information" includes sub-items of an "NFT ID", a "customized design ID", and a "target range".

The "NFT ID" is a code that can specify the NFT held by the user corresponding to the row data.

The "customized design ID" is a unique code given to each of the customized designs. The storage unit 13 of the server 10 may include a database that can specify a content of a customized design corresponding to a code from the code of the "customized design ID".

The "target range" represents a target range associated with the NFT in the customized design of the watch object 70. For example, in FIG. 22, an NFT with an NFT ID "N033" is registered in association with a portion including a bezel and a face in a customized design with a design ID "D2921". In addition, an NFT with an NFT ID "N059" is registered in association with a whole of a customized design with a design ID "D3418".

In customization of a design of the watch object 70 by the method of the above embodiment, a restriction may be added to the customization in relation to the customized design for which the NFT is registered.

For example, in a case where an NFT associated with a part (or a whole) of a design of a base model (a design of the watch object set as a customization target) is registered, permission of customization for changing the part (or the whole) of the design for which the NFT is registered may be prohibited.

Figure 23:
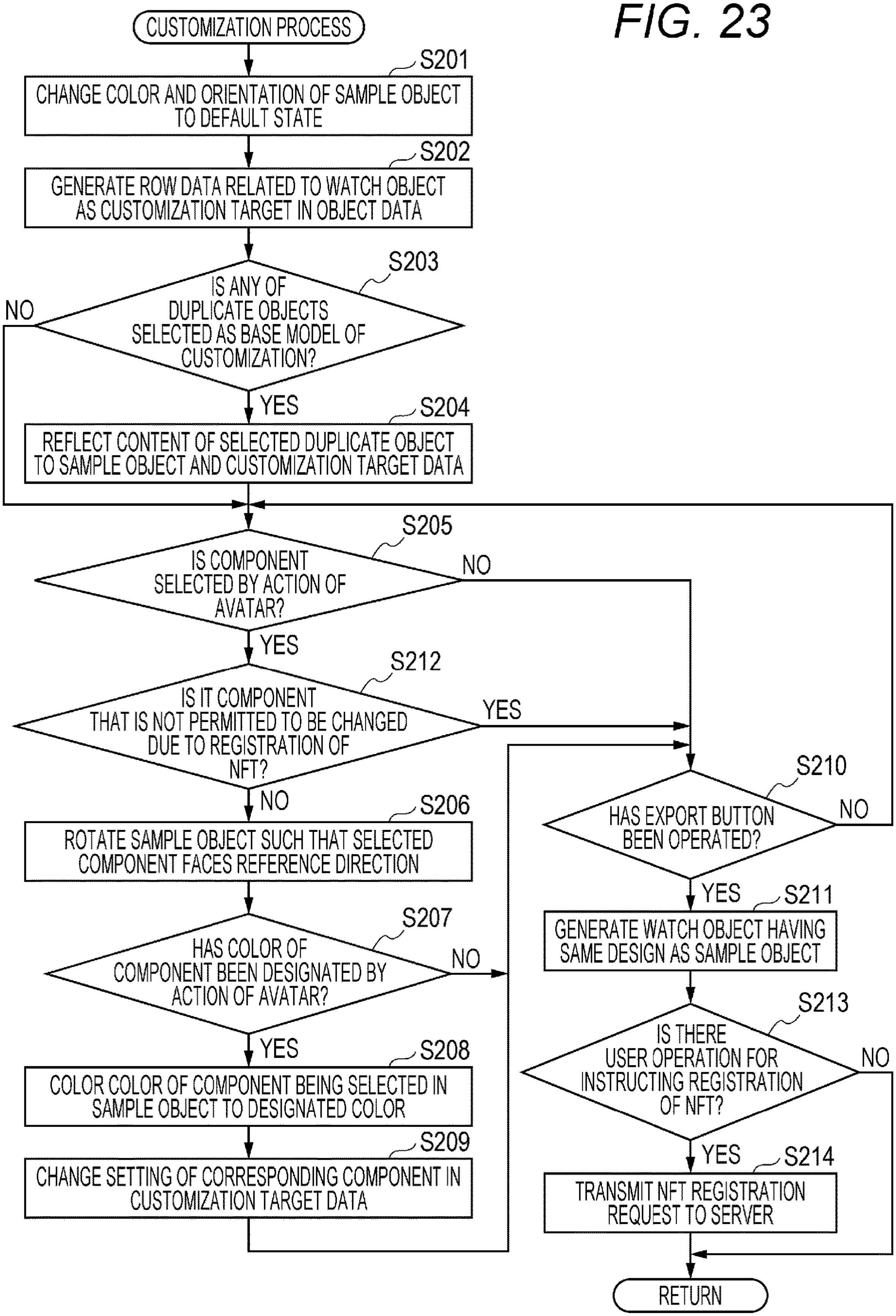
FIG. 23 is a flowchart illustrating a control procedure of customization processing according to the modification.

A flowchart of customization processing in this case is illustrated in FIG. 23. FIG. 23 corresponds to the customization processing of FIG. 18 in which step S212 is added after step S205, and steps S213 and S214 are added after step S211. In step S205 of the customization processing illustrated in FIG. 23, in a case where it is determined that a component is selected ("YES" in step S205), the CPU 21 determines whether it is a component that is not permitted to be changed due to registration of an NFT (step S212). In a case where it is not determined to be the component that is not permitted to be changed ("NO" in step S212), the CPU 21 causes the processing to proceed to step S206. In addition, in a case where it is determined to be the component that is not permitted to be changed ("YES" in step S212), the CPU 21 causes the processing to proceed to step S210.

When the watch object 70 is generated in step S211, the CPU 21 determines whether a user operation for instructing registration of an NFT has been performed (step S213). In a case where it is determined that the user operation has been performed ("YES" in step S213), the CPU 21 transmits the above-described NFT registration request to the server 10 (step S214). In a case where the processing in step S214 has ended, or in a case where it is determined in step S213 that the user operation for instructing registration of an NFT has not been performed ("NO" in step S213), the CPU 21 ends the customization processing.

Note that, in a case where an NFT associated with a part (or a whole) of the design of the base model is registered, permission of customization that may include the part (or the whole) of the design for which the NFT is registered without any change may be prohibited. In other words, for the part (or the whole) of the design of the base model for which the NFT is registered, a design change may be forced to obtain a design different from the part (or the whole).

In this case, for example, in a case where it is determined in step S210 of the customization processing illustrated in FIG. 18 that the export button 53 has been operated ("YES" in step S210), a determination step of determining whether a design for which an NFT is registered is included may be executed. In a case where it is determined in the determination step that the design for which the NFT is registered is not included, the processing proceeds to step S211. In addition, in a case where it is determined in the determination step that the design for which the NFT is registered is included, the processing proceeds to step S205.

In addition, in a case where the duplicate objects 80 are displayed in the virtual store 200 as illustrated in FIG. 16, the duplicate object 80 of the watch object 70 for which an NFT associated with a part (or a whole) of a design is registered and the duplicate object 80 of the watch object 70 in which any NFT is not registered may be arranged in mutually different areas in the virtual store 200. For example, the watch object 70 in which the NFT is registered may be arranged in the upper stage of two stages of shelves 202 illustrated in FIG. 16, and the watch object 70 for which any NFT is not registered may be arranged in the lower stage.

In a conventional technology, product objects in virtual spaces have various characteristics such as size, shape, and color setting in advance, so there is a problem that it is not possible to customize product objects according to user preference, avatar characteristics, etc.

Effect

As described above, in an information processing method according to the present embodiment, the CPU 21 as a computer controls an action of the avatar 40 corresponding to a user in the virtual space 2 in response to a user operation, causes the display unit 315 to display the virtual store 200 in the virtual space 2, the virtual store 200 including the customization IF 50 therein and being operated by the avatar 40 to perform customization of the watch object 70, and changes a setting related to the watch object 70, in a case where the customization IF 50 is operated by the avatar 40, to make the watch object 70 be customized in accordance with a content of the operation. As a result, it is possible to perform the customization of the watch object 70 in accordance with a preference of the user, a feature of the avatar 40, and the like in the virtual space 2. In addition, by customizing the watch object 70 in response to the avatar 40 operating the customization IF 50 provided in the virtual store 200, the customization can be naturally performed without impairing the sense of immersion in a world view of the virtual space 2.

In addition, the CPU 21 generates the customized watch object 70 in the virtual space 2 in response to a predetermined action of the avatar 40. As a result, the customized watch object 70 can be used in the virtual space 2.

In addition, the CPU 21 causes the generated watch object 70 to be worn on a region of the avatar 40 in response to a predetermined action of the avatar 40, and causes a position and an orientation of the watch object 70 in the virtual space 2 to follow a position and an orientation of the region of the avatar 40 in a case where the avatar 40 wearing the watch object 70 acts. As a result, the customized watch object 70 can be viewed as if being worn by the avatar 40.

In addition, the CPU 21 generates the sample object 60 of the watch object 70 in the virtual store 200, and changes a content of the sample object 60, in a case where the customization IF 50 is operated by an action of the avatar 40, so as to reflect a content of the customization of the watch object 70 in accordance with a content of the operation. In this manner, it is possible to clearly indicate a status of the customization, which is being performed by the user, using the sample object 60.

In addition, the customization IF 50 includes the target selection IF 51 configured to select a component to be set as a target of the customization among a plurality of components forming the watch object 70, and the CPU 21 changes an orientation of the sample object 60 to make a certain component of the sample object 60 face a reference direction in the virtual space 2 in a case where the certain component among the plurality of components is selected by the target selection IF 51. As a result, it is possible to clearly indicate the component set as the customization target to the user.

The reference direction is a predetermined front direction in the virtual store 200. As a result, the user can easily grasp the component set as the customization target by confirming the component facing the front direction.

In addition, the reference direction may be a direction from a position of the sample object 60 to a position of the avatar 40 in the virtual space 2. As a result, the component set as the customization target can be easily viewed from a first-person perspective (the VR screen 3151) of the avatar 40.

In addition, the CPU 21 controls actions of a plurality of the avatars 40 corresponding to a plurality of the users in the virtual space 2 in response to operations of the plurality of users, and in a case where the customization IF 50 is operated by each of actions of two or more avatars 40 different from each other among the plurality of avatars 40, changes the setting related to the watch object 70 such that the customization in accordance with a content of each of operations is performed for one watch object 70. As a result, a design of one watch object 70 can be created by the plurality of users while confirming a status of the components customized by another user.

In addition, the CPU 21 executes processing for ordering a product having a content corresponding to the customized watch object 70 in the real world in response to a predetermined action of the avatar 40. As a result, the user can purchase a watch reflecting a content of the customization in the virtual store 200 in the real world.

In addition, the CPU 21 starts generation of a linkage production watch object in the virtual space 2 in response to the start of production of an ordered watch in the real world. As a result, the production of the watch in the real world and the generation of the linkage production watch object in the virtual space 2 can be performed in a linked manner.

In addition, the CPU 21 provides the linkage production watch object generated in the virtual space 2 to the avatar 40 as the ordered watch is shipped to the user in the real world. As a result, the shipping of the watch in the real world and the provision of the linkage production watch object to the avatar 40 in the virtual space 2 can be performed in a linked manner.

In addition, the CPU 21 executes processing for registering an NFT, associated with a part or a whole of the design of the watch object 70 on which the customization related to the design has been performed, in association with the user in response to a predetermined operation of the user. As a result, it is possible to realize a service in which the NFT targeting the part or the whole of the customized design of the watch object 70 is provided to the user. This can also increase an added value of a virtual store service.

In addition, the CPU 21 controls actions of a plurality of the avatars 40 corresponding to a plurality of the users in the virtual space 2 in response to operations of the plurality of users, and sets the same watch object 70 as the watch object 70 worn by the avatar 40 that is being located in the virtual store 200 among the plurality of avatars 40, or the same watch object 70 as the watch object 70 worn by the avatar 40 that was located in the virtual store 200 in the past among the plurality of avatars 40 in the virtual store 200 as a target of the customization (base model). As a result, it is possible to customize the design with reference to the watch object 70 worn by another user (avatar 40). For example, in a case where a design of the watch object 70 worn by another user (avatar 40) is preferred, customization to a desired design can be easily performed on the basis of the preferred design.

In addition, in a case where an NFT associated with a part or a whole of a design of the watch object 70 set as the customization target is registered, the CPU 21 does not permit the customization of changing the part or the whole of the design of the watch object 70. Thus, the design in which the NFT is registered can be protected.

In addition, the CPU 21 controls actions of a plurality of the avatars 40 corresponding to a plurality of the users in the virtual space 2 in response to operations of the plurality of users, generates duplicate objects, obtained by duplicating at least one of the watch object 70 worn by the avatar 40 that is being located in the virtual store 200 among the plurality of avatars 40 and the watch object 70 worn by the avatar 40 that was located in the virtual store 200 in the past among the plurality of avatars 40 in the virtual store 200, and installs the duplicate objects 80 in the virtual store 200, and sets the same watch object 70 as any of the duplicate objects is as a target of the customization. As a result, it is possible to customize the duplicate object 80 close to a design desired by a user as a base model, and thus, it is possible to more easily customize the desired design. In addition, it is possible to provide the user with a customization idea by installing the duplicate objects 80 in the virtual store 200. In addition, the user can grasp the design trend from the duplicate objects 80.

In addition, the CPU 21 generates the duplicate objects 80, obtained by duplicating a predetermined number of the watch objects 70 most recently generated in the virtual store 200, installs the duplicate objects 80 in the virtual store 200, and sets the same watch object 70 as any of the duplicate objects 80 as a target of the customization. As a result, the trend of design customization in the virtual store 200 can be grasped and used as a reference for the user's own customization.

In addition, the CPU 21 arranges the duplicate object 80 of the watch object 70 for which an NFT associated with a part or a whole of a design is registered and the duplicate object 80 of the watch object 70 for which the NFT is not registered in mutually different areas in the virtual store 200. As a result, it is possible to easily grasp whether the NFT is registered in association with the design of the duplicate object 80.

In addition, the display unit 315 is provided in the VR headset 31 worn on a head of the user, and the CPU 21 causes the display unit 315 to display the virtual store 200 and the customization IF 50 viewed from a perspective of the avatar 40 in the virtual space 2. As a result, the VR can be applied in the virtual store service. That is, the user can experience the virtual store 200 constructed in the virtual space 2 as if it were real.

In addition, the CPU 21 displays the avatar 40 located in the virtual store 200 on the display unit 315 together with the virtual store 200. As a result, the virtual store service can be provided using the third-person perspective screen 3152.

In addition, the product object may be the watch object 70. As a result, it is possible to provide the virtual store service including a service related to customization of a watch design.

In addition, the information processing system 1 according to the present embodiment includes the CPU 21 as a processing unit, and the CPU 21 controls an action of the avatar 40 corresponding to a user in the virtual space 2 in response to a user operation, causes the display unit 315 to display the virtual store 200 in the virtual space 2, the virtual store 200 including the customization IF 50 therein and being operated by the avatar 40 to perform customization of the watch object 70, and changes a setting related to the watch object 70, in a case where the customization IF 50 is operated by the avatar 40, to make the watch object 70 be customized in accordance with a content of the operation. As a result, it is possible to perform the customization of the watch object 70 in accordance with a preference of the user, a feature of the avatar 40, and the like in the virtual space 2. In addition, by customizing the watch object 70 in response to the avatar 40 operating the customization IF 50 provided in the virtual store 200, the customization can be naturally performed without impairing the sense of immersion in a world view of the virtual space 2.

In addition, the program 231 according to the present embodiment causes the CPU 21 as a computer to execute processing of controlling an action of the avatar 40 corresponding to a user in the virtual space 2 in response to a user operation, processing of causing the display unit 315 to display the virtual store 200 in the virtual space 2, the virtual store 200 including the customization IF 50 therein and being operated by the avatar 40 to perform customization of the watch object 70, and processing of changing a setting related to the watch object 70, in a case where the customization IF 50 is operated by the avatar 40, to make the watch object 70 be customized in accordance with a content of the operation. As a result, it is possible to perform the customization of the watch object 70 in accordance with a preference of the user, a feature of the avatar 40, and the like in the virtual space 2. In addition, by customizing the watch object 70 in response to the avatar 40 operating the customization IF 50 provided in the virtual store 200, the customization can be naturally performed without impairing the sense of immersion in a world view of the virtual space 2.

In addition, in the information processing method according to the present embodiment, the CPU 311 of the VR device 30 as a computer of a terminal device displays the virtual store 200 in the virtual space 2 on the display unit 315, the virtual store 200 including the customization IF 50 operated by the avatar 40 to perform customization of the watch object 70, receives a user operation corresponding to an operation on the customization IF 50 by the avatar 40 in the virtual space 2 via the operation input unit 314 as an input unit, the sensor unit 317, and the controller 32, and displays the watch object 70, customized in accordance with a content of the operation of the customization IF 50 by the avatar 40 based on the user operation received via the input unit, on the display unit 315. As a result, it is possible to perform the customization of the watch object 70 in accordance with a preference of the user, a feature of the avatar 40, and the like in the virtual space 2. In addition, by customizing the watch object 70 in response to the avatar 40 operating the customization IF 50 provided in the virtual store 200, the customization can be naturally performed without impairing the sense of immersion in a world view of the virtual space 2.

Others

Note that the description in the above embodiment is an example of the information processing method, the information processing system, and the program according to the present invention, and the present invention is not limited thereto.

For example, functions of the information processing apparatus 20 may be integrated into the VR device 30 (for example, the VR headset 31), and the information processing apparatus 20 may be omitted. In this case, the VR device 30 (the VR headset 31) corresponds to the "information processing apparatus" according to the present invention.

In addition, an aspect in which a user operates the avatar 40 without wearing the VR headset 31 may be adopted. In this case, an image of the virtual space 2 is displayed on a typical display (for example, a liquid crystal display or the like included in the output unit 25 of the information processing apparatus 20) provided at a position visible to the user, instead of the VR headset 31. A screen displayed in this case may be the VR screen 3151 in a case where a movement of the user can be detected by the VR device 30. In addition, the third-person perspective screen 3152 may be displayed instead of the VR screen 3151. For example, an aspect in which the avatar 40 is operated from a third-person perspective in the virtual space 2 by the user operating the controller 32 may be adopted.

In addition, various services and operations are executed by cooperation of the VR device 30 and the information processing apparatus 20 after the start of the virtual store service in the above embodiment, but the present invention is not limited thereto. For example, the virtual store service may be executed by the server 10 integrating the functions of the information processing apparatus 20 and the VR device 30. In this case, signals output from the operation input unit 324 and the sensor unit 325 of the VR device 30 are transmitted to the communication unit 14 of the server 10 via the communication unit 326. The server 10 controls an action of the avatar 40 in the virtual store 200 (the virtual space 2) in accordance with the received user operation. That is, the server 10 performs processing similar to that of the information processing apparatus 20 described above, generates image data of the virtual store 200, and transmits the image data to the VR device 30.

In addition, the customization for changing a combination of colors of the respective components of the watch object 70 has been exemplified in the above embodiment, but a content of the customization is not limited thereto. For example, it may be possible to add a pattern handwritten (or prepared in advance) by a user to an appearance of a component. In addition, customization for changing a shape of a component may be possible.

In addition, a case where the design of the watch object 70 is customized has been exemplified in the above embodiment, but a target of the customization is not limited to the design. For example, functions of the watch object 70 may be customizable.

In addition, the interface configured to customize the product object is not limited to the customization IF 50 exemplified in the above embodiment, and may be any interface as long as the interface can be operated by the avatar 40.

In addition, although the watch object 70 has been exemplified as the product object, the present invention is not limited thereto, and can be applied to any product object handled in the virtual space 2.

Although an example in which the HDD or the SSD of the storage unit 23 is used as a computer-readable medium of the program according to the present invention has been disclosed in the above description, the present invention is not limited to this example. As other computer-readable media, information recording media such as a flash memory and a CD-ROM can be applied. In addition, a carrier wave is also applied to the present invention as a medium for providing data of the program according to the present invention via a communication line.

In addition, it is a matter of course that the detailed configuration and the detailed operation of each constituent element of the server 10, the information processing apparatus 20, and the VR device 30 in the above embodiment can be appropriately changed within a scope not departing from the gist of the present invention.

Although the embodiment of the present invention has been described above, a scope of the present invention is not limited to the above-described embodiment, and includes a scope of inventions described in the claims and a scope of the equivalents thereof.

What is claimed is:

1. An information processing method executed by a computer including a memory that stores a program, and at least one processor that executes the program, the information processing method comprising:
   - controlling actions of a plurality of avatars respectively corresponding to a plurality of users in a virtual space in response to operations of the plurality of users;
   - causing a display unit to display a virtual store in the virtual space;
   - causing the display unit to display an interface in the virtual store, the interface being operated by the plurality of avatars;
   - setting, as a target for performing customization of a product object identical to a product object worn by an avatar located in the virtual store among the plurality of avatars or a product object identical to a product object worn in the virtual store by an avatar previously located in the virtual store among the plurality of avatars; and
   - changing a customization setting related to the product object set as the target for performing customization, in a case where the interface is operated by the plurality of avatars, to make the product object set as the target for performing customization be customized in accordance with a content of each of the operations by the plurality of avatars.

2. The information processing method according to claim 1, further comprising:
   - generating a customized product object in the virtual space based on the changed customization setting of the product object set as the target for performing customization.

3. The information processing method according to claim 2, further comprising:
   - causing the generated customized product object to be worn on a region of a designated avatar of the plurality of avatars in response to a predetermined action of the designated avatar of the plurality of avatars; and causing a position and an orientation of the generated customized product object in the virtual space to follow a position and an orientation of a region of the designated avatar in a case where the designated avatar wearing the generated customized product object acts.

4. The information processing method according to claim 1, further comprising:

generating a sample object of the product object in the virtual store; and in a case where the interface is operated by an action of a designated avatar of the plurality of avatars, changing a content of the sample object to reflect the changed customization setting of the product object in accordance with content of operation of the interface by the designated avatar.

5. The information processing method according to claim 4, wherein the interface includes a target selection interface configured to select a portion to be set as the target for performing the customization among a plurality of portions forming the product object, and wherein the information processing method further comprises changing an orientation of the sample object to make a certain portion of the sample object face a reference direction in the virtual space in a case where the certain portion among the plurality of portions is selected by the target selection interface.

6. The information processing method according to claim 5, wherein the reference direction is a predetermined front direction in the virtual store.

7. The information processing method according to claim 5, wherein the reference direction is a direction from a position of the sample object to a position of the designated avatar in the virtual space.

8. The information processing method according to claim 1, further comprising:

executing processing for ordering a product with a content corresponding to the product object having the changed customization setting in a real world in response to a predetermined action of a designated avatar of the plurality of avatars; and starting generation of the product object having the changed customization setting in the virtual space as production of the ordered product is started in the real world.

9. The information processing method according to claim 8, further comprising:

providing the product object having the changed customization setting generated in the virtual space to the designated avatar as the ordered product is shipped to the user corresponding to the designated avatar in the real world.

10. The information processing method according to claim 1, further comprising:

executing processing for registering a non-fungible token, associated with a part or a whole of a design of the product object having the changed customization setting, in association with a designated user of the plurality of users in response to a predetermined operation of the designated user.

11. The information processing method according to claim 1, further comprising:

prohibiting changing the customization setting related to a part or a whole of a design of the product object set as the target of performing customization in a case where a non-fungible token associated with the part or the whole of the design of the product object set as the target of performing customization is registered.

12. The information processing method according to claim 1, further comprising:

generating duplicate objects obtained by duplicating at least one of the product object worn by the avatar located in the virtual store among the plurality of avatars and the product object worn in the virtual store by the avatar previously located in the virtual store among the plurality of avatars, and installing the duplicate objects in the virtual store; and setting, as the target for performing customization, a product object identical to any of the duplicate objects.

13. The information processing method according to claim 12, further comprising:

arranging, from amongst the duplicate objects generated, a duplicate object of a product object for which a non-fungible token associated with a part or a whole of a design is registered and a duplicate object of a product object for which the non-fungible token is not registered in mutually different areas in the virtual store.

14. The information processing method according to claim 1, further comprising:

generating duplicate objects obtained by duplicating a predetermined number of product objects generated most recently in the virtual store and installing the duplicate objects in the virtual store; and setting a product object identical to any of the duplicate objects as the target for performing customization.

15. The information processing method according to claim 1, further comprising:

causing the display unit to display the virtual store and the interface viewed from a perspective of a designated avatar of the plurality of avatars in the virtual space, wherein the display unit is provided in a head-mounted device configured to be mounted on a head of a user corresponding to the designated avatar.

16. The information processing method according to claim 1, wherein the product object is an object of a wristwatch.

17. An information processing system comprising:

a computer configured to:

control actions of a plurality of avatars respectively corresponding to a plurality of users in a virtual space in response to operations of the plurality of users;

cause a display unit to display a virtual store in the virtual space;

cause the display unit to display an interface in the virtual store, the interface being operated by the plurality of avatars;

set, as a target for performing customization of a product object identical to a product object worn by an avatar located in the virtual store among the plurality of avatars or a product object identical to a product object worn in the virtual store by an avatar previously located in the virtual store among the plurality of avatars; and change a customization setting related to the product object set as the target for performing customization, in a case where the interface is operated by the plurality of avatars, to make the product object set as the target for performing customization be customized in accordance with a content of each of the operations by the plurality of avatars.

* * * * *